Dec. 18, 1928.                                                                                                               1,695,561
C. F. PYM
MACHINE FOR SHAPING UPPERS OVER LASTS
Filed Aug. 8, 1924              10 Sheets-Sheet 1

INVENTOR
Charles F. Pym
By his Attorney
Nelson W. Howard

Dec. 18, 1928.  1,695,561
C. F. PYM
MACHINE FOR SHAPING UPPERS OVER LASTS
Filed Aug. 8, 1924   10 Sheets-Sheet 2

Dec. 18, 1928.  
C. F. PYM  
1,695,561  
MACHINE FOR SHAPING UPPERS OVER LASTS  
Filed Aug. 8, 1924 10 Sheets-Sheet 3

INVENTOR  
Charles F. Pym  
By his Attorney  
Nelson W. Howard

Dec. 18, 1928.

C. F. PYM 1,695,561

MACHINE FOR SHAPING UPPERS OVER LASTS

Filed Aug. 8, 1924     10 Sheets-Sheet 6

INVENTOR.
Charles F. Pym
By his Attorney
Nelson W. Howard

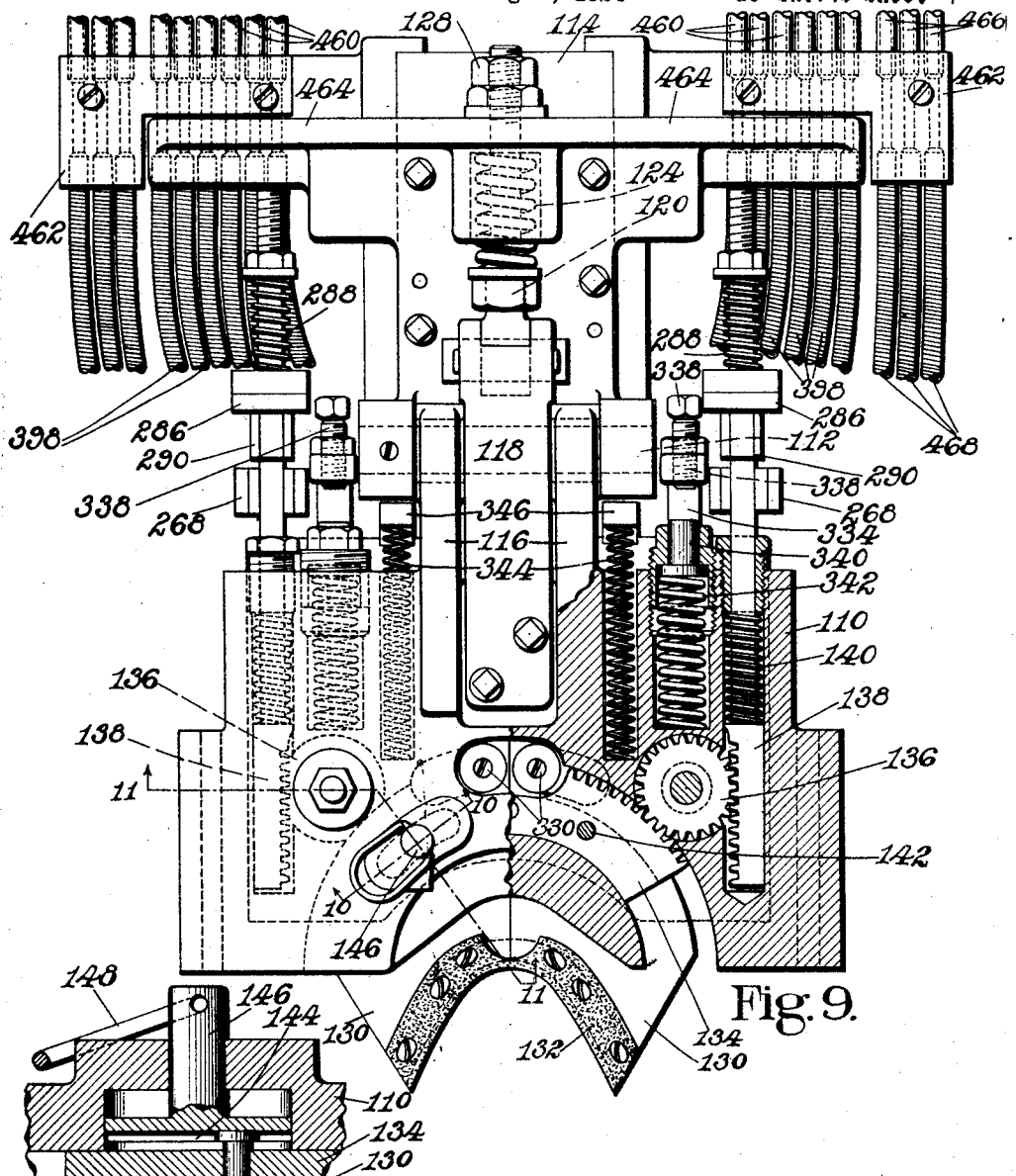
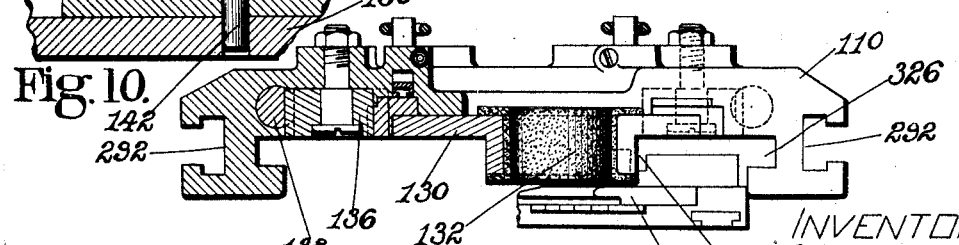
Fig. 9.
Fig. 10.
Fig. 11.

Dec. 18, 1928.

C. F. PYM 1,695,561

MACHINE FOR SHAPING UPPERS OVER LASTS

Filed Aug. 8, 1924 10 Sheets-Sheet 8

Dec. 18, 1928. 1,695,561
C. F. PYM
MACHINE FOR SHAPING UPPERS OVER LASTS
Filed Aug. 8, 1924 10 Sheets-Sheet 9

INVENTOR.
Charles F. Pym
By his Attorney
Nelson W. Howard

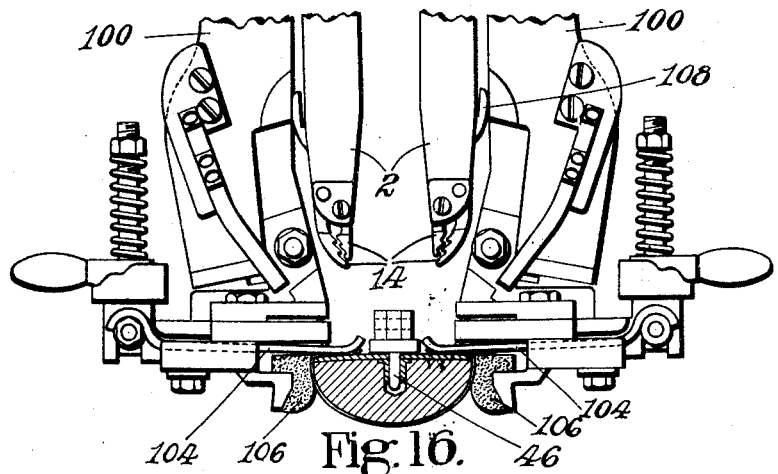
Fig.16.
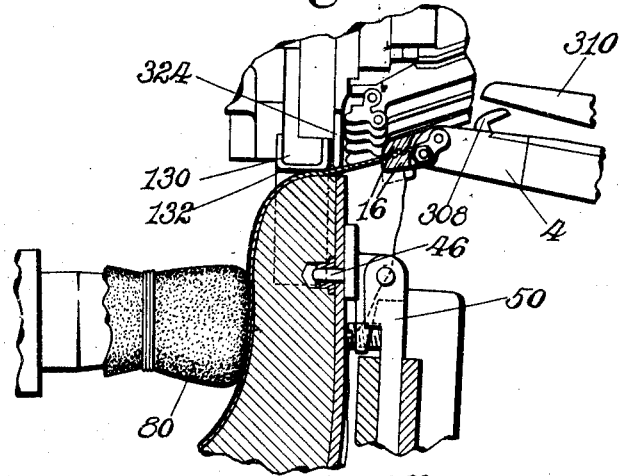
Fig.17.
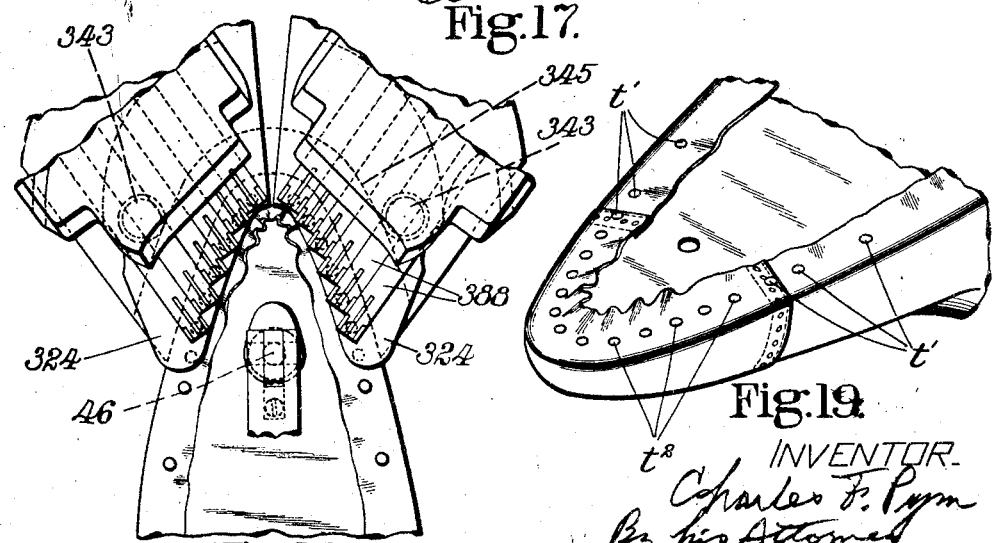
Fig.18.
Fig.19.
INVENTOR
Charles F. Pym
By his Attorney
Nelson M Howard Patented Dec. 18, 1928.

1,695,561

UNITED STATES PATENT OFFICE.

CHARLES F. PYM, OF BEVERLY, MASSACHUSETTS, ASSIGNOR TO UNITED SHOE MACHINERY CORPORATION, OF PATERSON, NEW JERSEY, A CORPORATION OF NEW JERSEY.

MACHINE FOR SHAPING UPPERS OVER LASTS.

Application filed August 8, 1924. Serial No. 730,929.

This invention relates to machines for shaping uppers over lasts in the manufacture of boots and shoes, and is herein illustrated in its application to a machine organized to pull the upper over the last and to last the toe of the shoe. It will be recognized, however, that in many of its novel and useful aspects the invention is not limited to machines for performing both pulling-over and lasting operations nor to means for lasting the toe end of the shoe.

Among its general objects the invention has in view the provision of a machine organization for performing lasting or pulling-over and lasting operations more expeditiously and more satisfactorily than heretofore without the need for any great amount of manual labor or for such a high degree of care and skill on the part of the workman as conditions have usually demanded in the lasting of shoes. The machine herein shown is designed particularly for McKay shoe work in which the upper is fastened in lasted position at the toe by lasting tacks, but it will be recognized that in various aspects the invention is not limited in utility to that kind of work.

Important features of the invention are to be recognized in a novel organization for shaping an upper over a last comprising means for wiping the upper about the toe heightwise of the last and inwardly over the bottom of the last (i. e., for "upwiping" and "overwiping" the upper). The machine herein shown is provided with upwiping means and overwiping means movable as a unit heightwise of the toe to cause the upwiping means to wipe the upper to the edge of the insole and to position the overwiping means in the proper plane for the overwiping operation, and with power-driven mechanism for operating the upwiping means and the overwiping means in automatically determined time relation to each other. In the organization herein illustrated, including means for pulling the upper over the last, the pulling-over means prepares the upper for the toe lasting operation and cooperates with the wiping means to produce a properly lasted toe. The pulling-over means comprises grippers for pulling the upper at the toe end and at the opposite sides of the forepart of the last, and in the machine shown the toe gripper continues to hold the upper under tension until the upwiping means has clamped the upper about the toe and has performed a considerable portion of the upwiping operation, thus guarding against loss of the pulling-over tension and insuring a tightly lasted toe. Thereafter the toe gripper is tripped automatically to release the upper.

The invention also presents important novel features in the combination of upper fastening means with other parts of the organization. The machine herein shown has means for driving lasting tacks to hold the toe portion of the upper in lasted position, and for purposes of McKay shoe work the tacks are fully driven and clinched. To hold the upper properly, McKay shoes usually require a comparatively large number of toe lasting tacks driven closely together, and the line of tacks should bear a predetermined relation to the edges of the wipers. The invention, in one important aspect, provides, in combination with each of the overwiping wipers, a gang of tackers movable as a unit with the wiper in fixed relation thereto, the tackers being relatively adjustable to vary the tacking line. Accordingly, when different wipers are substituted for different sizes or shapes of shoes, the tackers are correspondingly adjustable to meet the requirements of the different wiper contours. As herein illustrated, the wipers are so constructed as to determine the adjusted relation of the tackers. It will be evident that in the tacker and wiper combination provided, the invention, in various novel aspects, is applicable to heel lasting as well as to toe lasting.

The above and other novel features of the invention, including various details of construction and combinations of parts, will now be more particularly described with reference to the accompanying drawings and thereafter pointed out in the claims.

In the drawings,

Fig. 9 is a view, partly in front elevation and partly in vertical section, of the toe wiper mechanism and a portion of the tack supplying mechanism;

Fig. 10 is a section on the line 10—10 of Fig. 9 showing how the wipers which wipe the upper heightwise of the toe may be detached;

Fig. 11 is a view of the wiper mechanism partly in inverted plan and partly in section on the line 11—11 of Fig. 9, with portions of the structure broken away;

Fig. 16 is a view illustrating the relation of the side grippers and the side overwiping and tacking devices to the shoe;

Fig. 17 illustrates the relation of the toe gripper and of the toe wipers to the shoe at the beginning of the upwiping operation;

Fig. 18 illustrates the relation of the wipers and the tacker mechanisms to the shoe at the end of the overwiping operation; and Fig. 19 is a perspective view of the toe of a lasted shoe.

The invention is herein illustrated in its application to a machine of the same general type as that shown in United States Letters Patent No. 1,409,190 granted on March 14, 1922, upon an invention of R. F. McFeely, that type of machine including various well-known mechanisms some of which are more fully shown and described in other Letters Patent including particularly Patent No. 1,029,387 granted upon an application of R. F. McFeely on June 11, 1912. In view of the prior disclosures in these and other patents, the present description will be confined, for the most part, to such features and details as differ from the earlier constructions, and those parts of the organization which are common to the earlier disclosures will be referred to only as may be necessary for an understanding of the features of the present invention.

Figure 6:
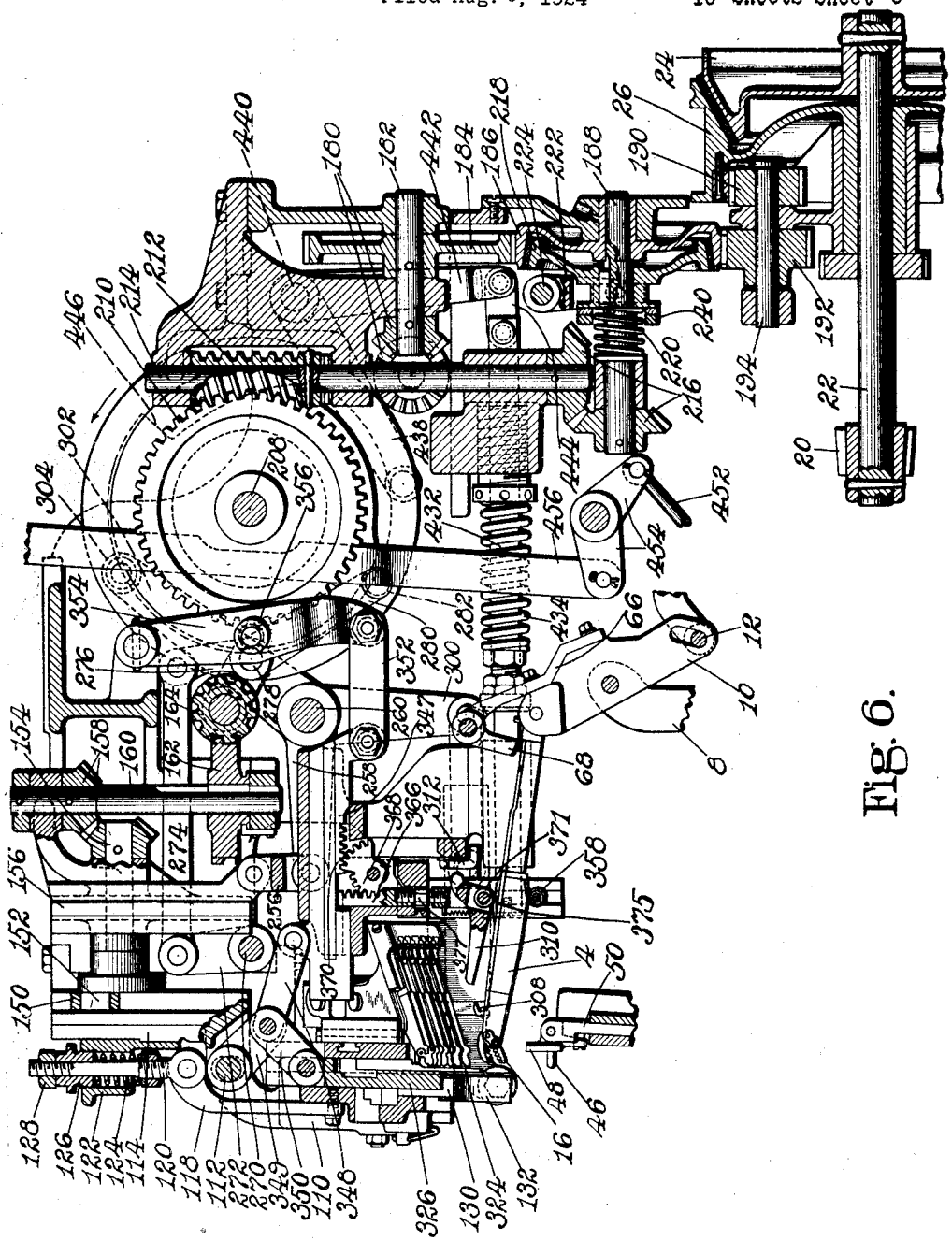
Fig. 6 is a vertical section substantially on the line 6—6 of Fig. 5.

As in the organization of the machine shown in Patent No. 1,409,190, the shoe, in the machine herein illustrated, is positioned with its toe end pointing upward in a substantially vertical direction, and the upper of the shoe in that position is engaged by opposite side grippers 2 and by a toe gripper 4. These grippers, in their construction and mode of operation, may be and are herein shown as substantially like the disclosure of a prior McFeely Patent No. 1,030,264, granted on June 18, 1912, the grippers being operated to grip and pull the upper yieldingly through lever mechanism controlled by cams on a main cam shaft 6. A portion of a cam-controlled lever 8 for operating the toe gripper 4 is shown in Fig. 6, and in further conformity to a well-known prior construction frequently utilized in machines of the same general type, the lever 8 acts upon a short lever 10 fulcrumed at one end on a pin 12 on the frame of the machine and connected with the gripper at its other end. The upper gripping jaws 14 of the side grippers may be constructed in any well-known manner. The toe gripper in the contruction shown is provided with a single pair of jaws 16 which are curved in such manner as to embrace the upper about the end of the toe.

Figure 4:
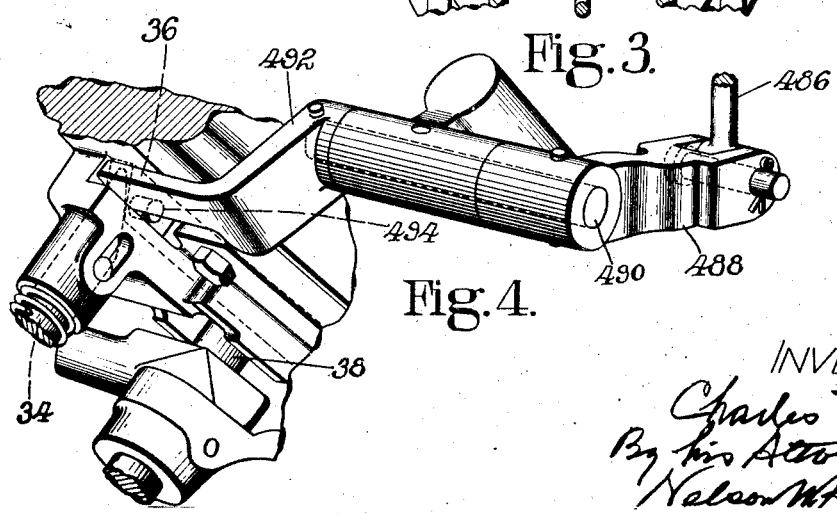
Fig. 4 is a detail view showing in perspective a portion of the mechanism for controlling the power operation of the machine.

The cam shaft 6, which operates the grippers and various other instrumentalities, is operated and controlled by mechanism substantially as shown in Patent No. 1,409,190. Briefly described, there is secured to the cam shaft a large bevel gear wheel 18 driven by a pinion 20 upon a shaft 22 which has on its outer end a clutch member 24 (Fig. 6) arranged to be engaged by a cooperating clutch member fast on a constantly running pulley 26. The means for controlling the clutch, as in the disclosure of Patent No. 1,409,190, comprises mechanism similar in construction and mode of operation to the disclosure of a prior McFeely Patent No. 791,986 granted on June 6, 1905. A starting treadle 28 is connected by a rode 30 to a lever 32 which imparts lengthwise movement to a rod 34 (Figs. 1 and 4), this rod having a wedge face for imparting movement to a slide 36 by the action of which a spring-controlled rod 38 is released. When this rod is released it acts to lift a brake shoe 40 from engagement with an inner face on the gear wheel 18, and through a lever 42 and a link 44 the clutch member 26 is forced into engagement with the member 24, thereby starting the cam shaft 6 in operation. It will be understood that at the end of each stage of the cycle the clutch is released and the brake is applied automatically to bring the cam shaft 6 to a stop, and as usual in this type of machine the parts are thus brought to a stop first at the end of the upper pulling movement of the grippers.

While in its general aspect the invention is not limited as to the character of the shoe positioning means, it is important in a machine provided, as herein shown, with automatic toe lasting mechanism both that the toe of the shoe be positioned with substantial accuracy in proper relation to the wipers and that the shoe be held firmly against the pressure of the wipers. For the purposes in view, the machine herein shown is provided with means for positioning the forepart of the last and shoe which is of the same general character as disclosed in Letters Patent No. 1,674,059, granted on June 19, 1928 upon an application of Arthur F. Pym, comprising a pin 46 formed and arranged to extend through a hole in the insole and into a hole in the bottom of the forepart of the last, as illustrated in Figs. 16 and 17. As set forth in said last-mentioned Letters Patent, the hole in the last is formed in accurately predetermined relationed to the edge contour of the last bottom, and the pin has an accurately predetermined realtion to the wipers, so that the toe of the shoe is presented in the correct position to receive the action of the wipers. The pin 46 projects from a plate 48 which engages the bottom of the insole and thus assists in determining the location of the plane of the toe end of the insole in relation to the wipers. The pin 46 and the plate 48 are supported on a member 50 which is a part of the usual sole rest of machines of this general type. It will be evident that, in addition to positioning the toe of the last accurately, the pin 46 serves further to hold the last against displacement under the pressure of the wipers. Further to assist in supporting the shoe there is provided a heel rest 52 which is moved upward into engagement with the heel end of the shoe in the first stage of the cycle, as common heretofore in pulling-over machines.

Figure 2:
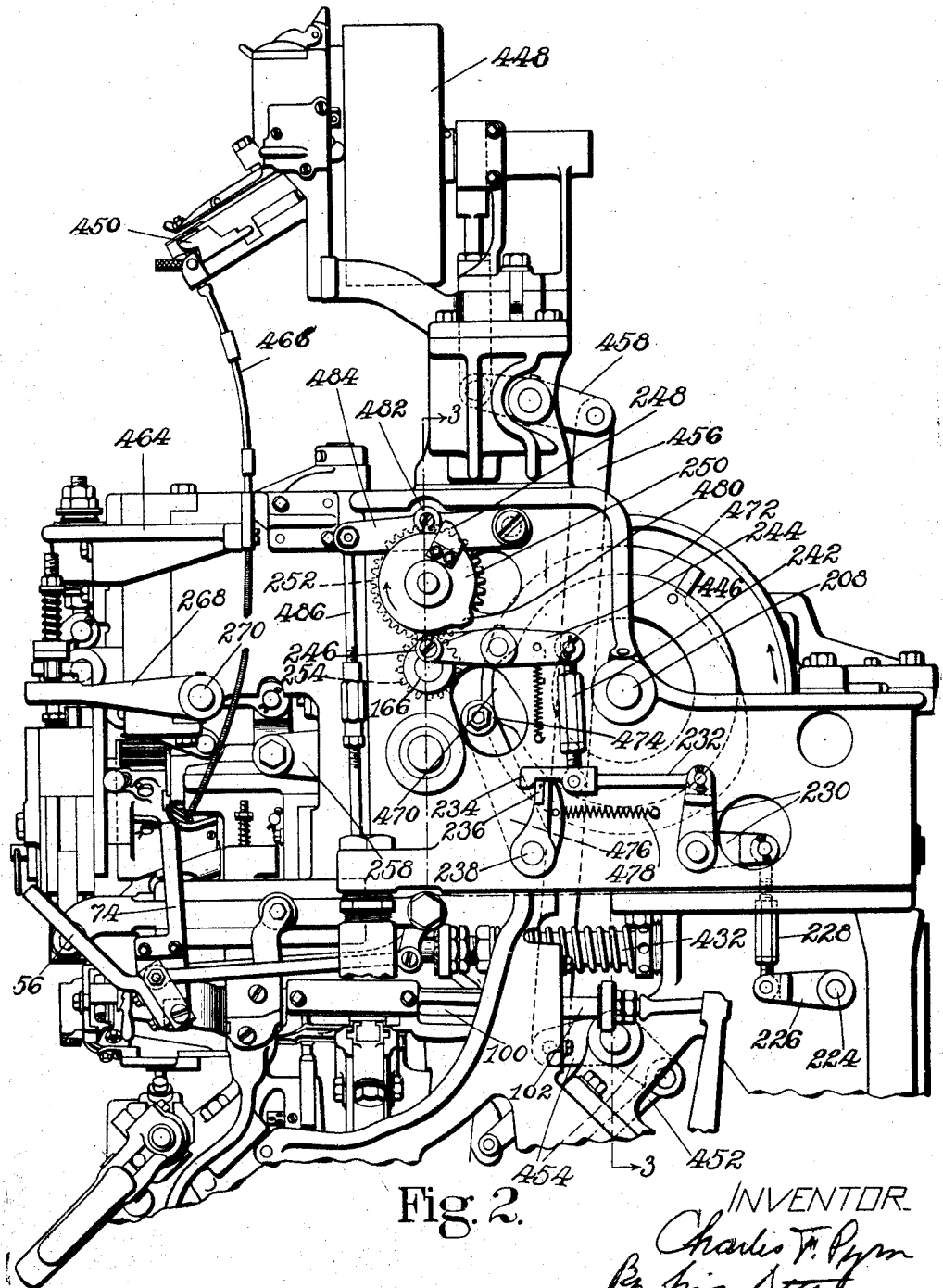
Fig. 2 is a view in side elevation of the upper portion of the opposite side of the machine including the tack supplying mechanism.
Figure 8:
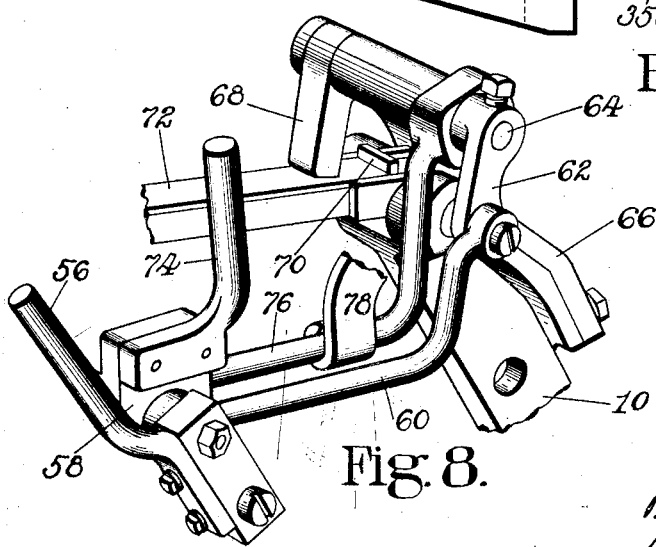
Fig. 8 is a detail perspective view of manual means provided for opening the toe gripper.

After the machine has come to a stop at the end of the first stage of the cycle with the upper held under tension by the grippers, the operator is enabled to inspect the shoe and to make any of the well-known adjustments, for example to straighten the tip or to vary the force by which the upper is pulled by one or more of the grippers. For varying the force of the pull of the side grippers the machine herein shown is provided with power-operated mechanisms controlled by levers 54 as shown and described in Patent No. 1,409,190. In case it should be desired to readjust the upper in the toe gripper, the machine has means of the same general character as that illustrated in Patent No. 1,029,387 for opening the toe gripper jaws and for thereafter permitting them to close again. For convenience of control the construction herein shown comprises (Figs. 2 and 8) a hand lever 56 pivoted on a block 58 and connected by a link 60 to a lever 62 on one end of a rock shaft 64 which is mounted in a bracket 66 fastened to the gripper lever 10, this rock shaft having fast thereon a finger 68 arranged to engage a lug 70 on the usual slide 72 connected to the gripper casing. It will be understood that by swinging the lever 56 to the right (Fig. 8) the parts are operated to move the slide 72 in the same direction and thereby to open the gripper jaws, and that upon release of the lever the jaws are automatically closed again. For greater ease of operation of the lever 56 there is provided a handle 74 on the block 58 to be engaged by the fingers of the same hand with which the operator engages the lever 56. The block 58 is carried by a rod 76 supported partly by a strap 78 and partly by a bearing on the shaft 64. It will thus be seen that the gripper opening mechanism moves with the lever 10 but is at all times in convenient position for the operator to manipulate it.

When the machine is started for the second time by depression of the treadle 28, shoe supporting means is moved into engagement with the top of the forepart of the shoe. This shoe supporting means and its operating mechanism are similar in many respects to the disclosure of Patent No. 1,409,190. For engaging the shoe, in the machine herein shown, there is provided a pad 80 mounted on a holder 82 which is slidingly moveable in a bearing member 84 in directions heightwise of the shoe, a spring 86 being provided for pressing the holder 82 toward the shoe and for thus rendering the shoe supporting pressure of the pad 80 yieldable. The member 84 is adjustably secured to an arm 88 mounted to swing on a rod 90 carried by a supporting arm 92 which is mounted at 94 on the frame for movement about an axis at right angles to the axis of the rod 90. The arm 88 is initially inclined laterally of the shoe at such an angle that the pad 80 is positioned at one side of the shoe, and before depressing the starting treadle for the second time the operator swings the arm manually to carry the pad into a position opposite to the top of the forepart of the shoe. When the machine is started the arms 88 and 92 are swung as a unit about the axis 94 to force the pad 80 yieldingly against the shoe. For this purpose the arm 92 is connected by a link 96 to a cam-operated slide 98. In the machine herein shown the cam for operating the slide 98 is so shaped as to impart to the arm 92 a portion only of its full movement at the beginning of the stage of the cycle under discussion, thereby applying the pad 80 to the shoe with sufficient pressure to hold it effectively for the side wiping and tacking operations, and thereafter near the end of the same stage of the cycle the cam imparts further movement to the arm, as more fully hereinafter explained.

In the second stage of the cycle, after the pad 80 has been applied to the shoe, the portions of the upper which have been pulled by the side grippers are wiped inwardly over the bottom of the insole and are fastened by tacks t' (Fig. 19) which in the machine shown, for purposes of McKay work, are fully driven and clinched. The means for wiping the upper inwardly and for fastening it at the sides is of well-known construction, in most respects substantially as shown in Patent No. 1,409,190. This means comprises side tacker arms 100 (Figs. 1 and 16) which carry tack holding and driving instrumentalities including tack driver bars 102 (Figs. 1 and 2), and which serve also to support wipers 104 of a well-known type and pads 106 for clamping and holding the upper at the sides of the shoe. It will be understood that the tacker arms 100 and the side grippers 2 are swung inwardly together and that by engagement of the tacker arms with latch members 108 on the side grippers these grippers are caused to release the upper. Thereafter the tacks t' are driven, and similarly to the operation of the machine shown in Patent No. 1,409,190 the side tacker arms and their wipers and tackers are then withdrawn from the shoe and returned to starting position before the machine comes to a stop at the end of the second stage of the cycle. In the meantime the toe gripper has maintained its hold upon the upper.

For lasting the toe of the shoe there is provided a wiper carrier 110 mounted to swing heightwise of the toe on a bearing rod 112 which is fast in a vertically movable slide 114 mounted in guideways in a portion of the frame of the machine. For supporting it on the rod 112 the wiper carrier 110 is provided with a pair of upwardly extending arms 116. It will be understood that the upwiping means, hereinafter described, is carried into engagement with the toe and face of the shoe by downward movement of its supporting means including the slide 114.

It is desirable that the upwiping means be maintained yieldingly in engagement with the end face of the toe, and for this purpose there is secured to the wiper carrier 110 an arm 118 connected at its upper end to a plunger 120 which is mounted for vertical movement in a bracket 122 secured to the slide 114. A spring 124 acts on the plunger 120 to press it downwardly. It will be seen by reference particularly to Figs. 6 and 12 that the openings in the arms 116 through which the rod 112 extends are enlarged above and below the rod, thereby permitting relative upward or downward movement between the wiper carrier 110 and the slide 114, so that when downward movement of the wiper carrier is stopped by the shoe the slide 114 may continue its downward movement against resistance of the spring 124, thus applying yielding pressure to the shoe through the wiper carrier and the wipers. A threaded member 126 (Fig. 6) through which the plunger 120 extends, cooperating with a nut 128 on the upper end of the plunger, serves to limit adjustably downward movement of the wiper carrier 110 relatively to the slide 114, and it will be seen that when the parts are in idle position the wiper carrier is thus supported by the plunger 120, the rod 112 being positioned between the upper and lower ends of the openings provided in the arm 116. It will be understood that there is provision for sufficient play in the connections described to permit such short swinging movements as the wiper carrier has about the rod 112.

For wiping the upper heightwise of the toe the wiper carrier 110 carries a pair of wipers 130 (Figs 6, 9 and 11) comprising plates having edges curved to conform substantially to the contour of the toe, these edges in the construction shown being faced or covered by a strip or band 132 of flexible material, for example, leather, arranged to extend continuously about the toe from one side of the toe to the other side. The wipers 130 are mounted in a recess in the wiper carrier 110 and are fastened to gear segments 134 movable in curved paths and having teeth which intermesh with the teeth of pinions 136. Engaging these pinions are rack bars 138 pressed downwardly by springs 140 to maintain the wipers 130 normally in open position. The wipers 130 are closed about the toe by relative movement of the wiper carrier 110 and the rack bars 138, as more fully hereinafter explained. Since it is desirable that differently shaped wipers 130 be sometimes substituted for differently shaped toes, provision is made for readily detaching the wipers. For this purpose there are provided pins 142 extending through the gear segments 134 into openings in the wipers, these pins having flanged heads which are slidable in curved slots 144 formed in members 146. The members 146 are movable in openings (Fig. 10) formed in the wiper carrier 110 to withdraw the pins 142 from the wipers 130 and thus to release the wipers, the members 146 having handles 148 for convenience in manipulating them.

Figure 3:
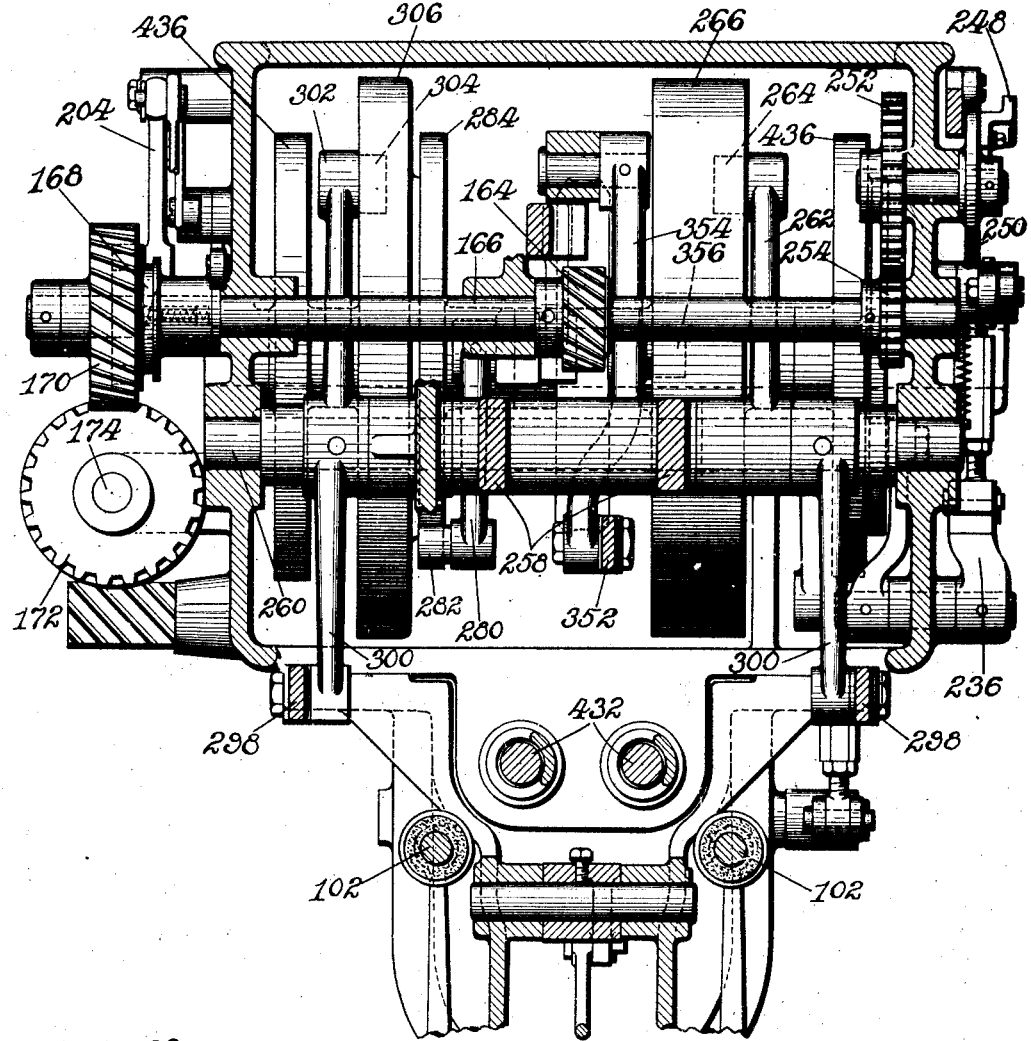
Fig. 3 is a vertical section substantially on the line 3—3 of Fig. 2.

To position the toe lasting mechanism clear of the side wiping and tacking devices when the latter are operating on the shoe, it is necessary that the wiper carrier 110 be maintained at a considerable elevation above the end of the toe, and for convenience the machine herein shown is accordingly provided with mechanism for moving the carrier 110 downwardly to carry the wipers approximately into operative position, and with additional mechanism for thereafter completing the downward movement of the carrier. For thus moving the wipers approximately to operative position, the slide 114 is formed with a transverse guideway in which is slidably mounted a block 150 (Fig. 6) engaged by a crank pin 152, the latter being carried by a shaft 154 mounted in bearings in an additional vertically movable slide 156. The shaft 154 is connected by beveled pinions 158 to a vertical shaft 160 mounted in upper and lower bearings in the slide 156, and keyed to the shaft 160 is a spiral gear 162 engaged by a spiral gear 164 which is fast on a shaft 166 (Fig. 3). The shaft 166 is provided with a clutch 168 for connecting it to a constantly rotating spiral gear 170 driven by a cooperating gear wheel 172 on a shaft 174. The shaft 174 is connected by spiral gearing 176 to a shaft 178 which is connected in turn by beveled gearing 180 (Fig. 6) to a shaft 182 on which is a gear wheel 184 driven by a gear wheel 186 loosely mounted on a shaft 188. The gear wheel 186 is driven by an internal gear formed on the pulley 26 through pinions 190 and 192 fast on a shaft 194. It will thus be seen that the constantly running pulley 26, through the connections described, rotates the spiral gear member 170 continuously, and when this member is clutched to the shaft 166 movement is imparted to the crank pin 152 to move the slide 114 downwardly.

The toe lasting mechainsm is started in action near the end of the second stage of the cycle of the main cam shaft 6 during which the upper is wiped over and tacked at the sides of the forepart at the rear of the toe, as hereinbefore explained, and for thus initiating the operation of the toe lasting means the clutch 168 is controlled by mechanism operated by the cam shaft 6 before the latter comes to a stop. It has already been explained that the cam for operating the shoe supporting arm 92 imparts to the arm a supplemental movement near the end of the second stage of the cycle thus increasing the pressure of the pad 80 on the shoe. The principal reason for thus imparting successive movements to the arm 92 is for convenience in utilizing the second movement of the arm to trip the clutch 168. For this purpose the arm 92 carries a pin 196 (Fig. 1) which engages a spring-controlled latch 198 carried by a lever 200, this lever being connected by a link 202 to a bell-crank member 204 for controlling the clutch 168. This clutch may be of any suitable type, and is herein shown as a well-known form of pin clutch which is tripped by movement of the depending arm of the bell-crank 204. It will be understood that the pin 196 slips past the latch 198, thus immediately releasing the lever 200 and the bell-crank 204 to the action of a spring 206 which returns the bell-crank into position to release the clutch 168 at the completion of one revolution of the shaft 166. The spiral gears 162 and 164 are so proportioned as to impart to the shaft 154 a half revolution for one revolution of the shaft 166, thus turning the crank pin 152 to its lower limit of movement where it remains throughout the operation of the toe lasting means on the shoe.

Before the shaft 166 comes to a stop it acts to start in operation means for imparting further downward movement of the wiper carrier 110 and for carrying out the cycle of operations of the toe lasting mechanism on the shoe. This means includes in its organization a cam shaft 208 having thereon a spiral gear wheel 210 driven by a worm 212 on a shaft 214, this shaft being connected by beveled gearing 216 to the shaft 188 on which the gear wheel 186 turns as hereinbefore explained. The gear wheel 186 is shaped to serve as one member of a clutch, cooperating with a clutch member 218 which is keyed to the shaft 188 and is slidable thereon. The member 218 is pressed by a spring 220 toward the wheel 186, but is controlled by a crank arm 222 fast on a rock shaft 224 (Fig. 2.), this shaft having an arm 226 connected by a link 228 and a bell-crank 230 to a link 232. The link 232 has thereon a member 234 engaged by an arm 236 which is fast on a cam-controlled rock shaft 238 to hold the clutch member 218 normally out of engagement with the member 186 against the resistance of the spring 220 and in engagement with a brake member 240. When the link 232 is swung upwardly to disconnect the member 234 from the arm 236, the spring 220 is permitted to act on the clutch member 218 to release it from the brake and to set the clutch, thus starting the cam shaft 208 in operation. For thus raising the link 232 it is connected by a link 242 to one arm of a lever 244 the other arm of which carries a roll 246 arranged to be engaged by a member 248 on a disk 250 operated through gearing 252, 254 by the shaft 166.

It will be seen that the proportion of the gears 252, 254 is such that the disk 250 is turned through only a half revolution to one revolution of the shaft 166, and that the member 248 acts on the lever 244 substantially at the end of the revolution of the shaft 166, immediately releasing the lever 244 so that the member 234 is dropped downwardly again to be acted upon by the member 236 at the proper time to disconnect the clutch as hereinafter explained.

The supplemental downward movement of the wiper carrier 110 to carry the wipers 130 into pressure applying relation to the toe end of the shoe is effected by downward movement of the slide 156 which, as hereinbefore explained, carries the shafts 154 and 160, the shaft 160 at this time sliding relatively to the gear wheel 162. It will be understood that the crank pin 152 is at this time at its lower dead center and therefore acts as a rigid connection to impart further downward movement to the slide 114 until the spring 124 is compressed somewhat, as already explained. For the purpose of this downward movement there is connected to the slide 156 a two-armed link 256 connected to a pair of lever arms 258 (Figs. 3 and 6) mounted to turn about a shaft 260, and fixed to these lever arms is an arm 262 having a cam roll 264 operated by a path cam formed in one side of a cam wheel 266 fast on the shaft 208.

As hereinbefore stated, the closing of the upwiping wipers 130 about the toe is effected by relative movement of the wiper carrier 110 and the rack bars 138. For effecting and controlling the closing of these wipers there are provided lever arms 268 fast on a rock shaft 270 and forked at their front ends to embrace the rack bars 138. The shaft 270 is provided (Fig. 6) with a crank arc 272 connected by a link 274 to a crank arm 276 on a shaft 278, and connected to the arm 276 is an arm 280 having a cam roll 282 engaged by a peripheral cam 284 on the shaft 208. Slidingly mounted on the rack bars 138 are members 286 pressed downwardly by springs 288 into engagement with limit stops 290 on the bars. In that portion of the downward movement of the wiper carrier 110 which is effected by turning of the crank pin 152 the members 286 are carried substantially into engagement with the lever arms 268. Subsequently, in time relation to the further downward movement of the wiper carrier, the arms 268 are operated by their cam 284 to move the members 286 upwardly, thereby closing the wipers 130 about the toe and pressing them yieldingly against the sides of the toe through compression of the springs 286.

By reference to Fig 17 it will be seen that the wipers 130 are closed about the toe at a short distance from the plane of the insole. After the wipers have been thus closed, and with the band 132 held in firm frictional engagement with the upper, the wipers and the band are moved heightwise of the toe to wipe the upper to the edge of the insole, this upwiping operation being performed by swinging the wiper carrier 110 about the rod 112. It will be seen that the wiper carrier 110 is provided at its opposite sides with guideways 292 in which are mounted slides 294 pivotally connected to horizontal slides 296, which are mounted in the frame of the machine and are connected by links 298 to crank arms 300 fast on the rock shaft 260. Also fast on the shaft 260 is a crank arm 302 provided with a cam roll 304 engaged by a path cam formed in one side of a cam wheel 306 on the shaft 208. Through these connections the required swinging movement is imparted to the wiper carrier for upwiping the upper about the toe.

Figure 1:
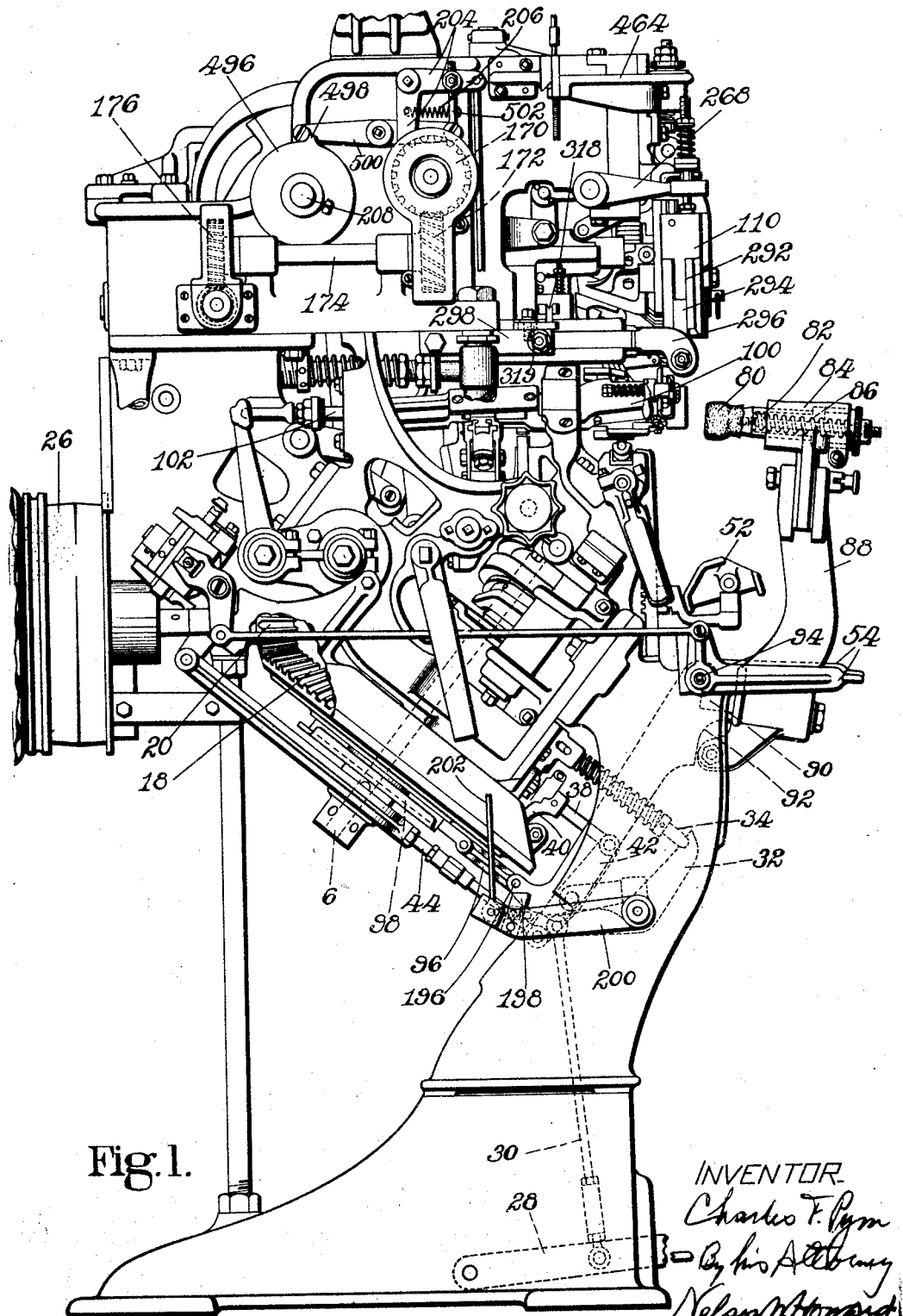
Fig. 1 is a view in side elevation of a machine in which the invention is embodied, with the tack supplying mechanism at the top of the machine broken away.
Figure 7:
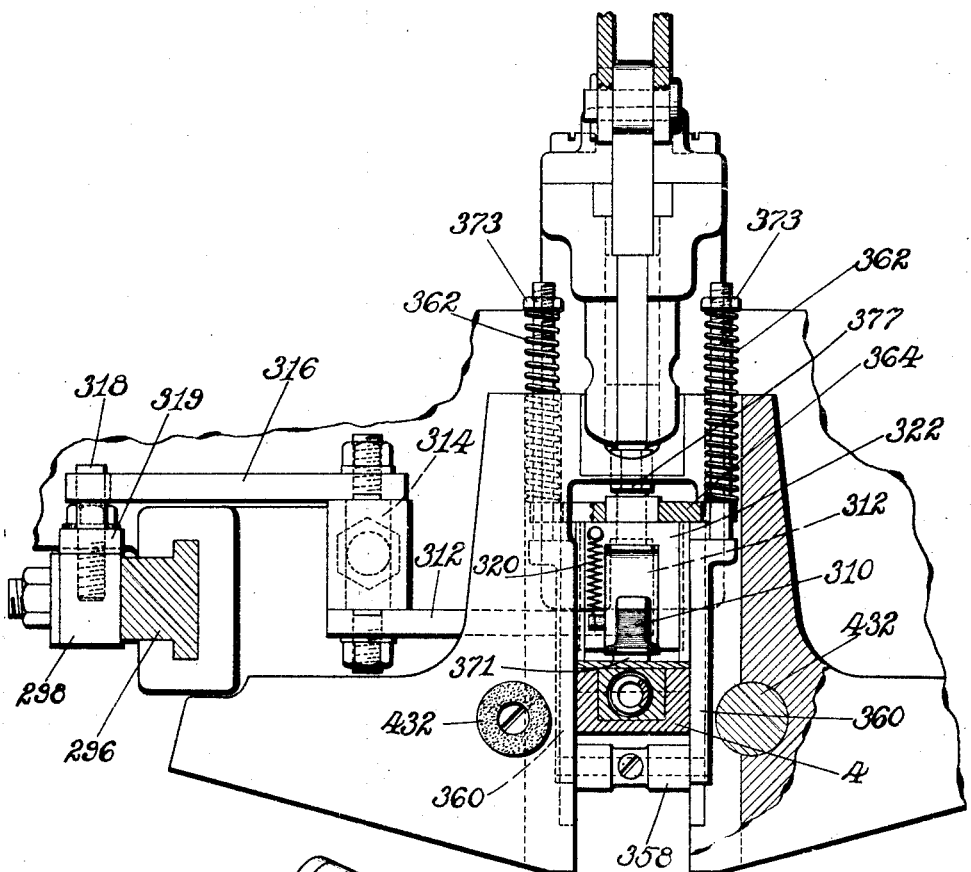
Fig. 7 is a view partly in front elevation and partly in vertical section showing means for controlling the toe gripper.

Substantially at the end of the upwiping operation the toe gripper is tripped to cause it to release the upper. By reference to Fig. 6 it will be seen that the toe gripper is provided as heretofore with a finger 308 for tripping it, and in the upper pulling operation this finger is carried under the end of a lever 310 which is pivotally mounted above the gripper. For operating the finger 308 to trip the gripper one arm of the lever 310 is engaged by the end of a lever 312 (Figs. 6 and 7), this lever being carried by a rock shaft 314 on which is mounted a lever arm 316 slotted at its outer end to embrace a pin 318 carried by one of the link members 298 hereinbefore mentioned as a part of the means for imparting to the wipers their upwiping movement, the pin 318 being mounted on a slide 319 which is adjustable to vary the time when the gripper is tripped, as indicated in Fig. 1. A spring 320 serves to hold the lever 310 in position for the finger 308 to be carried under it. The lever 310 is mounted on a vertically movable slide 322 hereinafter referred to as part of the means for determining the vertical position of the toe gripper.

After the upwiping operation has been effected and while the upper is held clamped continuously, free from wrinkles, about the toe by the wipers 130 and their band 132, the margin of the entire toe portion of the upper is gathered and wiped inwardly over the insole. For this purpose the wiper carrier 110 is provided with a pair of overwiping wipers 324 supported by a wiper holder or slide 326 which is movable lengthwise of the shoe in the carrier 110. The wipers 324 are detachably secured to gear segments 328 mounted in curved guideways in the slide 326. For thus detachably securing the wipers to the gear segments in such manner as to permit different wipers to be readily substituted for different shapes of toes, there are provided screws 330 having plane heads normally sunk in corresponding depressions in the wiper plates (Fig. 12), these screws being threaded through the gear segments 328 and having slots at their inner ends facing the front of the machine to be engaged by a screw driver inserted through openings provided in the gear segments 134 and the wiper carrier 110, as shown in Fig. 9. It will be understood that in detaching the wipers the screws 330 are turned enough to remove their heads from the depressions in the wiper plates, whereupon slots 331 in the wiper plates permit the latter to be readily detached.

The slide 326 is guided in the wiper carrier 110 for movement closely adjacent to the upwiping wipers 130, and the wipers 324 are positioned to operate in a plane immediately at the rear of the wipers 130, as shown in Fig. 6. The slide 326 carries gear segments 332 provided with gear teeth in engagement with the teeth of the wiper carrying segments 328 and also provided with gear teeth engaging the teeth of rack bars 334 which are movably mounted in the slide 326. Springs 336 act on these rack bars to hold the wipes 324 normally in open position. At their outer ends the rack bars 334 have offset portions provided with adjustable screws 338 the ends of which are arranged to engage plungers 340 (Fig. 9) controlled by springs 342 mounted in the wiper carrier 110 upon downward movement of the slide 326 relatively to the wiper carrier. In this way the rack bars 334 are rendered effective yieldingly to cause the wipers 324 to close inwardly over the shoe in response to further downward movement of the slide 326. Pins 343 carried by the wipers 324 are arranged to engage shoulders 345 (Figs. 11 and 18) on the upwiping wipers 130, so that these wipers, which are positioned as determined by the contour of the shoe, limit the overwiping movement of the wipers 324 and determine the distance from the edge of the shoe bottom at which the tacks are driven, as will be more fully understood from a consideration of the relation, hereinafter described, between the wipers 324 and the tackers. It will also be seen that the pins 343 by their engagement with the wipers 130 act to increase the pressure of these wipers on the shoe as the overwiping operation is completed. To assist in supporting the slide 326 there are provided springs 344 seated in recesses in the carrier 110 and engaging lugs 346 on the slide 326.

For operating the slide 326 to advance the wipers 324 and cause them to close through the operation of the mechanism above described, there is provided a slide 347 (Fig. 6) connected by a link 348 to a toggle 349, 350, the arm 349 being pivoted on the rod 112 and the arm 350 connected to the slide 326. The slide 347 is connected by a link 352 to a lever arm 354 which carries a roll 356 operated by a path cam formed in one side of the cam wheel 266.

When the wipers 324 receive their advancing and closing movements, movement is imparted to the toe gripper 4 to carry it out of the path of movement of the wipers and of the tackers which move with the wipers. The toe gripper (Figs. 6 and 7) is supported on a roll 358 which is carried by vertically movable members 360 supported by springs 362 upon a plate 364 which rests upon the upper end of the slide 322 hereinbefore referred to as carrying the gripper tripping lever 310, this slide being mounted in guideways in the members 360. The slide 322 is connected to a rack bar 366 engaged by the teeth of a gear segment 368 which is also provided with teeth engaging rack teeth 370 formed on the wiper advancing and closing slide 347. It will thus be seen that when the slide 347 receives its operative movement the rack bar 366 is moved downwardly to carry the toe gripper downwardly in response to the resulting downward movement of the slide 322 and the members 360. The toe gripper is held between the roll 358 beneath it and a roll 371 above it, the roll 371 being mounted on the slide 322 at the axis of the lever 310, and the gripper is clamped between these rolls by the springs 362 which press upwardly against nuts 373 on rods which are carried by the members 360. By reference to Fig. 6 it will be seen that on its upper face the toe gripper is provided with a cam 375 engaging the roll 371, and in the rearward upper pulling movement of the gripper this cam permits the springs 362 to act on the roll 358 to lift the gripper and thus to impart to it a pulling movement also lengthwise of the last. The gripper is thus moved yieldingly upward in pulling the upper and positively downward to make way for the toe lasting means. The connections between the slide 322 and the rack bar 366 include a turn buckle 377 whereby the vertical position of the toe gripper may be adjusted.

After the upper has been wiped inwardly over the insole by the wipers 324, the wipers are made to increase their pressure on the upper through the mechanism hereinbefore described for swinging the wiper carrier about the rod 112, the cam which operates the lever arm 302 being so shaped as to impart to the wiper carrier at this time movement heightwise of the toe in the direction to increase the wiper pressure. Thereafter the upper is fastened to the insole about the toe by the driving of a plurality of lasting tacks $t^2$ (Fig. 19) and clinching the tacks as usual in McKay shoe work. The machine herein shown is constructed to drive twelve of these tacks, but it will be understood that the number of the tacks may be varied as may be required for different shapes and sizes of shoes, for example by varying in a well-known way the number of the tacks delivered to the tacking mechanisms.

Figure 12:
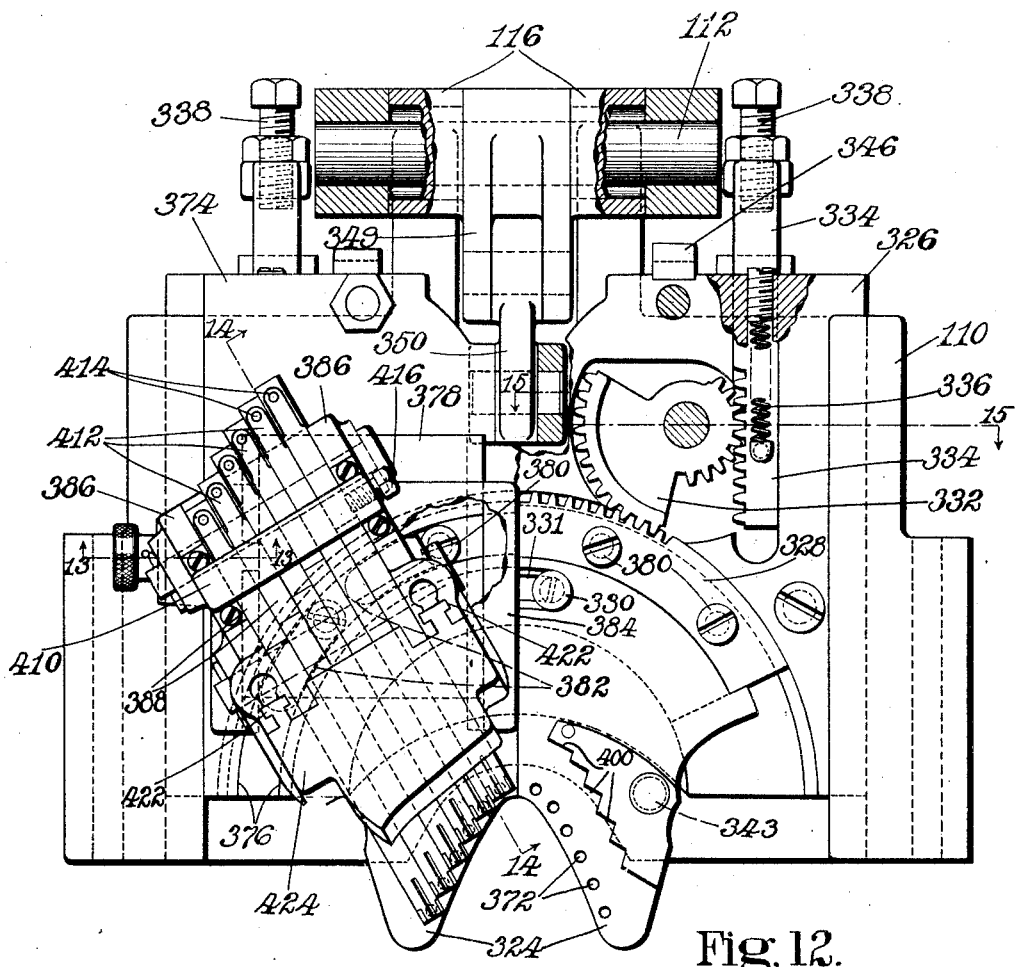
Fig. 12 is a rear elevation of the wiper and tacker mechanisms, with parts broken away, showing the wipers which wipe the upper inwardly over the bottom of the last, the upwiping wipers being removed.
Figure 14:
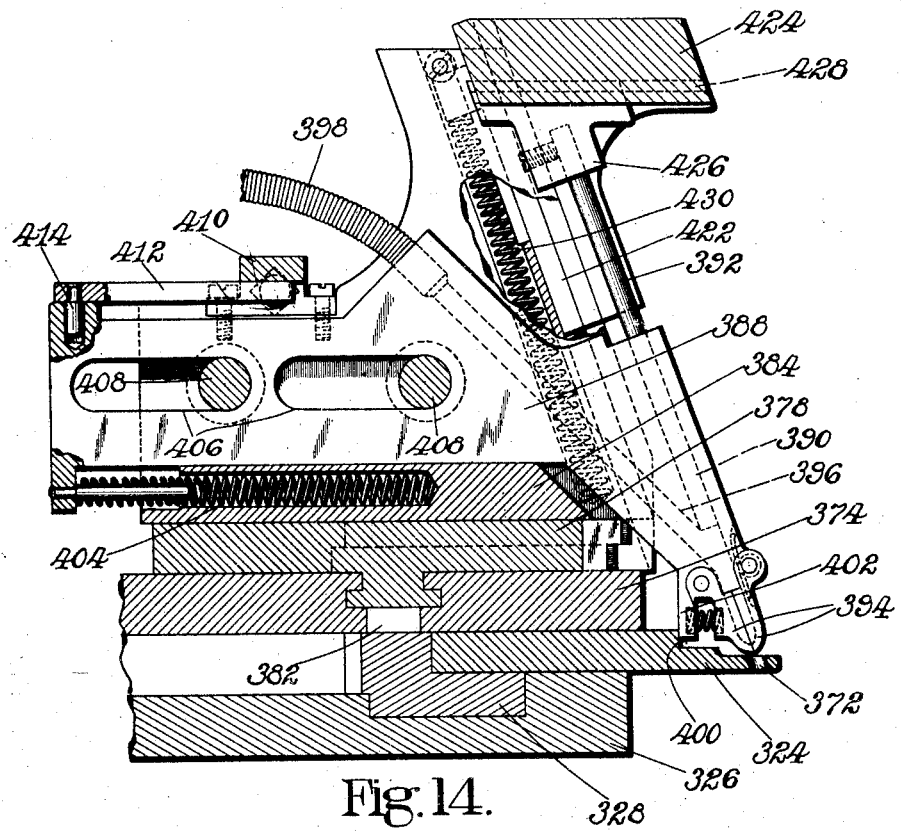
Fig. 14 is a section on the line 14—14 of Fig. 12 showing only the wipers which appear in Fig. 12 and the associated tacker mechanism.
Figure 15:
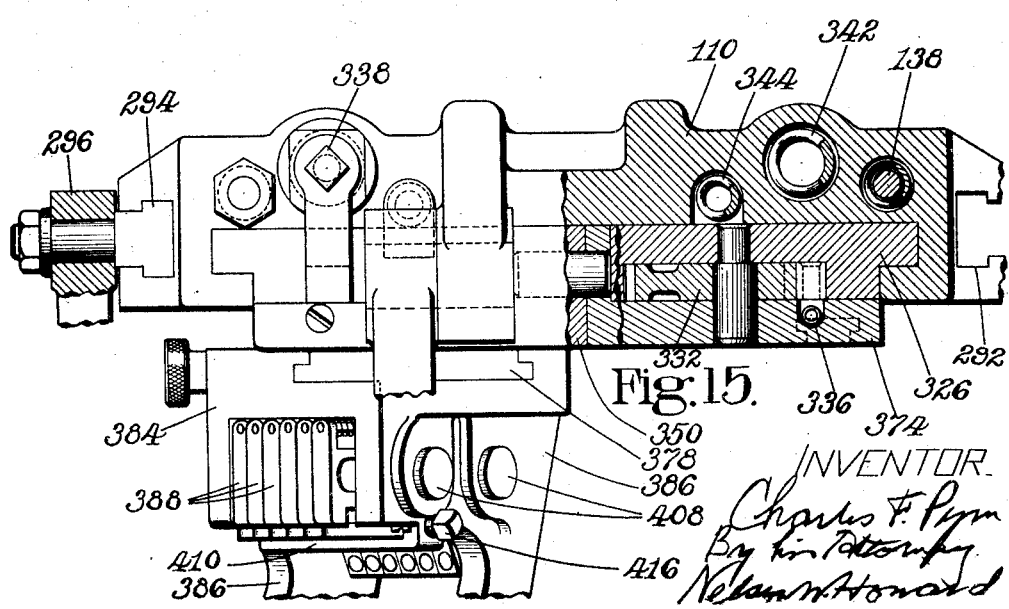
Fig. 15 is a view of the toe wiper and tacker mechanism, partly in plan and partly in section on the line 15—15 of Fig. 12.

By reference to Fig. 12 it will be seen that the lasting tacks are driven through holes 372 in the wiper plates 324. To support the tacking means there is provided a cover plate 374 which is secured to the wiper carrying slide 326 and is provided with a guideway 376 curved similarly to the guideway in the slide 326 in which the gear segments 328 are mounted. Slidably mounted upon the cover plate 374 are tacker supporting plates 378, one for each of the wiper plates, having curved projections which slide in the guideway 376. Carried by the gear segments 328 are screws 380 the heads of which project through curved slots 382 (Figs. 12 and 14) in the plate 374 and enter holes provided in the plates 378, so that the plates 378 are moved by the gear segments 328 in unison with the wipers 324. Detachably mounted on each of the plates 378 is a casting or holder 384 for a gang of tackers, the holder being provided with projecting side walls 386 between which are mounted a number of tacker plates 388 corresponding to the greatest number of tacks to be driven. Each of these tacker plates is provided with a guideway 390 for a tack driver 392 and has thereon a pair of spring controlled tack fingers 394 forming a tack pocket for holding the tack. Tacks are fed to each tack pocket through a guideway 396 from a flexible tack tube 398.

Each of the wipers 324 is provided with a plurality of shoulders 400 for positioning the different tacker plates 388 with their tack pockets in proper adjusted relation to the holes 372, the plates 388 having projections 402 for engaging the shoulders. Seated in recesses in the casting 384 are springs 404, one for each tacker plate 388, which act normally to hold the tacker plates with their projections 402 against the corresponding shoulders 400. Extending through slots 406 in the several tacker plates 388 and through the side walls 386 of the holder 384 are pins 408 which assist in maintaining the tacker plates in assembled relation. Extending across from one side wall 386 to the other is a bar 410, and under this bar are positioned a plurality of fingers 412 which are mounted on pivot studs 414 on the different respective tacker plates 388. In a downturned end portion of the bar 410 is threaded a set screw 416 which bears on one of the fingers 412 and acts to clamp all these fingers together and against the opposite downturned end of the bar, thereby holding the several tacker plates 388 securely in the relation determined by the shoulders 400. It will be seen that by the provision of the pivoted fingers 412 the different tacker plates 388 are secured without any binding or cramping action on the plates themselves or on the operating parts associated therewith.

Figure 13:
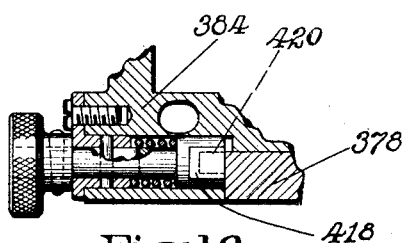
Fig. 13 is a section on the line 13—13 of Fig. 12.

Each casting 384 is fastened to its supporting plate 378 by means of a spring plunger 418 (Fig. 13) which enters an opening formed in the guiding flange 420 on the plate 378. It will be seen that the assembled tacker mechanisms may be removed each as a unit without disturbing the wiper plates 324, and it will also be understood that each wiper plate 324 by its shoulders 400 predetermines the positions of the tackers to aline properly with the holes 372. In assembling the parts the several tacker plates 388 will preferably be pushed forwardly against the resistance of their springs 404 and clamped lightly by use of the set screw 416. The casting 384 is then moved into position on its supporting plate 378 and locked by the plunger 418. The screw 416 is then loosened, whereupon the springs 404 act to slide the tacker plates into the positions determined by the shoulders 400. Thereafter the set screw 416 is tightened again.

Mounted in guideways 422 in the side walls 386 of the casting 384 is a tack driver head 424 which carries the tack drivers 392, the latter being fastened in blocks 426 which are mounted in guideways 428 in the head 424. The driver head 424 is normally upheld by springs 430 which are seated in recesses in the walls 386 and engage lugs which project from the driver head. It will be understood that the guideways 428 are in the same planes as the tacker plates 388 and that these guideways facilitate the assembling and adjustment of the tackers.

For imparting operative movement to the tack driver heads 424 there are provided plungers 432 (Figs. 3, 6 and 7) which are operated by springs 434. These plungers are controlled independently of each other by peripheral cams 436 on the cam shaft 208 through bell-crank lever arms 438, 442 mounted to swing on a shaft 440, the arms 442 being connected by links 444 to the respective plungers 432. By reference to Fig. 6 it will be seen that the cams 436 are cut away as indicated at 446 to release the arms 438 and thus permit the springs 434 to act.

By reason of the large number of tacks required the machine is preferably provided with a pair of tack hoppers 448, only one of which is shown (Fig. 2) and with corresponding tack separators 450 constructed and operated as heretofore in machines of the same general type. It will be understood that oscillatory movements are imparted to the tack hoppers 448 in a well-known manner by a cam on the main cam shaft 6 through connections including a link 452, a bell-crank 454, a link 456 and a lever 458 connected to the tack hoppers. Leading from one of the separators 450 is a group of tack tubes 460 (Fig. 9), the lower ends of which are fast in a bracket 462 on the frame of the machine, and the tack tubes 398 leading from one of the groups of tacker plates 388 have their upper ends connected to one arm 464 of the bracket 122, hereinbefore referred to, which moves upwardly and downwardly with the wiper supporting slide 114. Similarly another group of tack tubes 460 leads from the other tack separator to the bracket 462 at the opposite side of the machine for supplying tacks to the tack tubes 398 leading to the tacker plates associated with the other wiper. From one of the separators also extend a group of three tack tubes 466 for supplying tacks through tubes 468 to one of the side tacker arms 100, and from the other separator similar tubes lead to the opposite side tacker arm. It will be understood that the tacks are supplied to the tacker plates of the wiper and tacker mechanism when the slide 114 and the arms 464 are in their uppermost position.

After the tacks have been driven the cam shaft 208, continuing its movement, returns the different parts controlled thereby to their starting positions, and the cam shaft is then brought to a stop automatically by the action of a stop cam 470 (Fig. 2) comprising a projection on a cam wheel 472 which is fast on the shaft 208. This cam is arranged to act on a roll 474 mounted on a lever 476 which is fast on the shaft 238 hereinbefore described, a spring 478 connected to the arm 236 on this shaft acting to hold the roll against the cam. It will be understood that after the starting of the cam shaft 208 in response to the lifting of the member 234, as hereinbefore described, the cam 470 moves out of engagement with the roll 474, permitting the spring 478 to swing the arm 236 to the right (Fig. 2) until this arm connects again with the member 234. Thereafter, when the cam 470 again arrives in position to swing the lever 476 to the left, the arm 236 acts through the member 234 and its connections to the clutch member 218 to disconnect this clutch member from its operating member 186 and to force it into engagement with the brake member 240.

Figure 5:
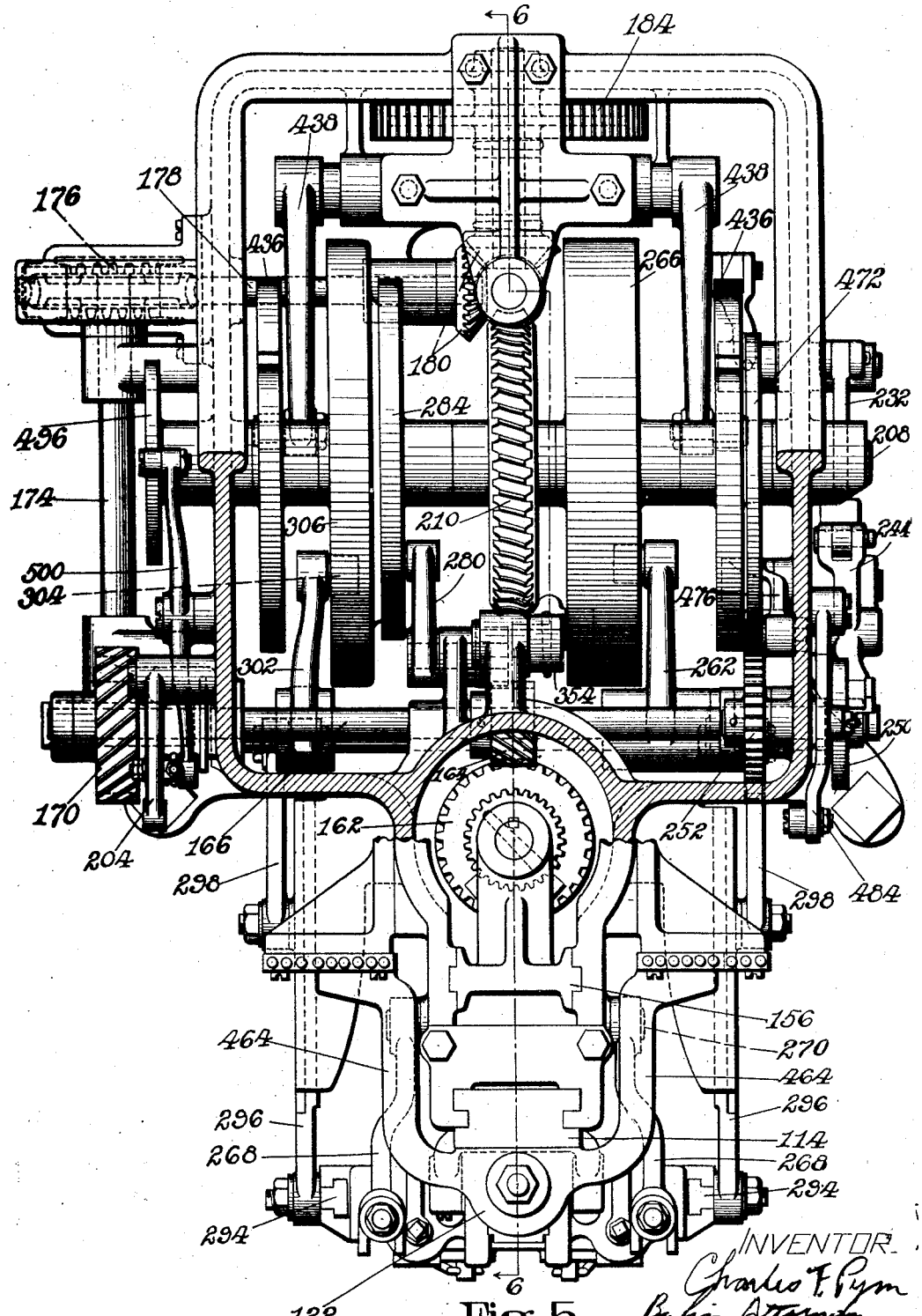
Fig. 5 is a plan view of the machine with the tack supplying mechanism at the top of the machine removed, parts being shown in horizontal section.

In order to complete the movement of the toe lasting mechanism to starting position it is necessary that the shaft 154 (Fig. 6) be turned through half a revolution to raise the crank pin 152 and the slide 114 to their upper limits of movement. For this purpose automatic means is provided for again tripping the clutch 168, this means comprising a cam disk 496 (Figs. 1 and 5) mounted on one end of the cam shaft 208 and provided with a projection 498 for operating a lever 500, this lever being connected by a link 502 to the clutch controlling bell-crank 204.

It is also necessary again to start the main cam shaft 6 in order that this cam shaft and the parts controlled thereby shall be likewise returned to starting position. For this purpose the cam disk 250 which is driven by the shaft 166 has a projection 480 (Fig. 2) which engages a cam roll 482 on a lever 484 and through this lever and a link 486 operates an arm 488 (Fig. 4) which is fast on a rock shaft 490 provided with an arm 492 for engaging a pin 494 on the clutch tripping slide 36 hereinbefore mentioned.

In the operation of the machine, briefly summarized, an assembled shoe is presented in position for the pin 46 to enter the corresponding hole in the forepart of the last, or in case the machine is not provided with such a pin but with a sole rest of the more common type, the shoe is positioned with the toe end face of the last engaging the toe gripper jaws 16. It will be understood that if the pin 46 is utilized it serves to support the shoe independently of the operator, thereby rendering it easier for the operator to position the margin of the upper materials properly within the toe and side gripper jaws. After the upper has thus been inserted in the gripper jaws the machine is started by depressing the treadle 28, whereupon the toe and side grippers grip and pull the upper and the sole rest member 50 receives a short forward movement in a direction opposite to the direction of the pull of the grippers. At this time also the heel rest 52 is moved up into engagement with the heel end of the shoe.

After the machine has come to a stop with the upper held under tension, the operator is enabled to make any of the usual adjustments, as hereinbefore described, to position the upper properly in its relation to the last. Thereafter the machine is again started by depression of the treadle 28. In this stage of the cycle the shoe rest 80, which has been swung by the operator into position in front of the shoe, is operated to apply supporting pressure to the top of the forepart of the shoe, the upper at the sides of the forepart at the rear of the toe is released from the side grippers and is wiped over and fastened by the tacks $t'$, as illustrated in Fig. 16, and thereafter the side tacker arms 100 are swung outwardly again away from the shoe. Before the cam shaft 6 comes to a stop at the end of this stage of the cycle, the lever 200 is operated to trip the clutch 168 through which the slide 114 which carries the toe lasting mechanism is moved downwardly, and through the mechanism controlled by this clutch the clutch member 218 (Fig. 6) is actuated to start the cam shaft 208 in operation. Through mechanism controlled by this cam shaft the toe lasting mechanism is moved farther downwardly and the upwiping wipers 130 are closed about the toe, and thereafter the wiper carrier 110 is swung about the rod 112 to cause the wipers 130 and their band 132 to wipe the upper to the edge of the insole. At or near the end of the upwiping operation the toe gripper is tripped to cause it to release the upper. Thereafter, in the continued operation of the cam shaft 208, the overwiping wipers 324 are advanced and are closed over the toe end of the last to wipe the upper inwardly over the insole. Moving as a unit with each of the wipers 324 is its associated tacking mechanism, and after the wipers have completed their overwiping movement the plungers 432 are released for operating the tack driver heads 424 to drive the lasting tacks. In the continued operation of the shaft 208 the parts controlled thereby are returned to their starting positions, the clutch 168 is again tripped for returning the slide 114 to its uppermost position, and the main clutch also is tripped automatically to cause the cam shaft 6 likewise to complete its cycle of movements. The shoe is then removed from the machine, the toe being lasted as illustrated in Fig. 19.

While the invention is herein illustrated in its application to a machine designed for driving lasting tacks such as are commonly used in McKay shoe work, it is to be understood that in many of its aspects the invention is not limited in utility to the use of fastenings of the particular form illustrated, and the term "tack" and similar terms are accordingly used herein for convenience of designation rather than by way of limitation.

Having described the invention, what I claim as new and desire to secure by Letters Patent of the United States is:

1. A pulling-over and toe lasting machine having, in combination, means for pulling an upper over a last, upwiping means and overwiping means movable as a unit heightwise of the toe with the upwiping means in engagement with the upper about the toe to wipe the upper to the edge of the insole, and power-driven mechanism for operating said upwiping means and overwiping means in automatically determined time relation to each other to upwipe the upper and to wipe its margin inwardly over the insole.

2. A pulling-over and toe lasting machine having, in combination, upper pulling means comprising a gripper for gripping and pulling an upper at the toe of a last, toe lasting mechanism comprising upwiping means and overwiping means movable as a unit heightwise of the toe to cause the upwiping means to wipe the upper to the edge of the insole, and power-driven means for operating said toe lasting mechanism to upwipe the upper and to wipe its margin inwardly over the insole and for causing the toe gripper to release the upper in time relation to the lasting operation.

3. A pulling-over and toe lasting machine having, in combination, upper pulling means comprising a gripper for gripping and pulling an upper at the toe of a last, upwiping means and overwiping means movable as a unit to cause the upwiping means to wipe the upper heightwise of the toe, mechanism for operating the overwiping means after the upwiping operation to wipe the toe portion of the upper inwardly over the bottom of the last, and automatic means to cause the toe gripper to release the upper while the upper is held by the upwiping means.

4. A pulling-over and toe lasting machine having, in combination, means for pulling an upper over a last, separate sets of toe-embracing wiper plates mounted for closing movements about the toe and arranged respectively to upwipe the upper and to wipe it inwardly over the bottom of the last, and power-driven mechanism for effecting relative movement of the last and the upwiping wiper plates to wipe the upper heightwise of the toe and for operating the overwiping wiper plates in automatically determined time relation to the upwiping operation.

5. A pulling-over and toe lasting machine having, in combination, means for pulling an upper over a last, a wiper carrier having thereon separate sets of toe-embracing wipers arranged respectively to upwipe the toe portion of the upper and to wipe its margin inwardly over the bottom of the last, said wiper carrier being movable lengthwise of the shoe to apply the upwiping wipers yieldingly about the toe while the upper is held by the upper pulling means, and power-driven mechanism for effecting relative movement of the last and the wiper carrier to cause the upwiping wipers to wipe the upper heightwise of the toe and for operating the overwiping wipers to wipe the upper inwardly.

6. A pulling-over and toe lasting machine having, in combination, upper pulling means comprising a gripper for gripping and pulling an upper at the toe of a last, upwiping means constructed to embrace the upper about the toe, means for effecting relative movement of the last and said upwiping means to wipe the upper heightwise of the toe, mechanism automatically operative to cause the toe gripper to release the upper substantially at the end of the upwiping operation, and toe-embracing wipers for wiping the toe portion of the upper inwardly over the bottom of the last while the upper is held about the toe by the upwiping means.

7. A pulling-over and toe lasting machine having, in combination, means for pulling an upper over a last, toe lasting mechanism comprising upwiping means and toe-embracing wipers mounted in fixed relation to said upwiping means in respect to movement heightwise of the toe, means for effecting relative movement of the last and said toe lasting mechanism to cause the upwiping means to wipe the upper heightwise of the toe after it has been tensioned by the upper pulling means, and mechanism for thereafter operating said wipers in time relation to the upwiping operation to wipe the upper inwardly over the bottom of the last.

8. A pulling-over and toe lasting machine having, in combination, means for pulling an upper over a last, toe lasting mechanism comprising wiper plates for engaging the upper and wiping it inwardly over the bottom of the last about the toe and also upwiping means for embracing the upper continuously about the end and the sides of the toe, and automatic means for effecting relative movement of said upwiping means and the last to wipe the upper heightwise of the toe prior to the overwiping operation.

9. A pulling-over and toe lasting machine having, in combination, upper pulling means comprising a toe gripper and opposite side grippers, overlaying and fastening devices at the opposite sides of the forepart of the shoe, means for operating said overlaying and fastening devices to lay the upper inwardly and to fasten it at the sides of the forepart at the rear of the toe and for then withdrawing said devices from the shoe while the toe gripper continues to hold the upper, and automatic means for thereafter lasting the toe of the shoe.

10. A pulling-over and toe lasting machine having, in combination, upper pulling means comprising a toe gripper and opposite side grippers, overlaying and fastening devices at the opposite sides of the forepart of the shoe, means for operating said overlaying and fastening devices to lay the upper inwardly and to fasten it at the sides of the forepart at the rear of the toe and for then withdrawing said devices from the shoe while the toe gripper continues to hold the upper, and toe lasting mechanism automatically operative after said overlaying and fastening devices have been withdrawn from the shoe to wipe the upper about the toe heightwise of the last and inwardly over the bottom of the last.

11. A pulling-over and toe lasting machine having, in combination, means for pulling an upper over a last, and automatic means for wiping the upper about the toe heightwise of the last and inwardly over the insole into lasted position and for driving a plurality of lasting tacks about the end and along the sides of the toe to hold it in lasted position.

12. A pulling-over and toe lasting machine having, in combination, power-driven means automatically operative to pull an upper over a last and to come to a stop with the upper held under tension, and means automatically operative upon a subsequent starting of the machine to wipe the upper about the toe heightwise of the last and inwardly over the insole into lasted position and to drive a plurality of lasting tacks to hold it in lasted position.

13. A pulling-over and toe lasting machine having, in combination, means for pulling an upper over a last comprising a gripper for gripping and pulling the upper at the toe end of the last, automatic means for wiping the upper about the toe heightwise of the last while the upper is held by the toe gripper, and means for thereafter wiping the toe portion of the upper inwardly over the bottom of the last into lasted position and for driving a plurality of lasting tacks to hold it in lasted position.

14. A pulling-over and toe lasting machine having, in combination, means for pulling an upper over a last, automatic means for thereafter wiping the upper about the toe heightwise of the last and inwardly over the insole into lasted position, and means for driving a plurality of lasting tacks to hold the upper in lasted position.

15. A pulling-over and toe lasting machine having, in combination, means for pulling an upper over a last comprising a gripper for gripping and pulling the upper at the toe end of the last, means for clamping the upper about the toe while the upper is held by the toe gripper and for effecting relative movement of the clamping means and the last to wipe the upper heightwise of the toe, automatic means to cause the toe gripper to release the upper, and means for wiping the upper about the toe inwardly over the bottom of the last into lasted position and for driving a plurality of lasting tacks to hold it in lasted position.

16. A pulling-over and toe lasting machine having, in combination, means for pulling an upper over a last, automatic means for clamping the upper about the toe while it is held by the upper pulling means and for effecting relative movement of said clamping means and the last to wipe the upper heightwise of the toe, and means for thereafter wiping the toe portion of the upper inwardly over the bottom of the last into lasted position and for driving a plurality of lasting tacks to hold it in lasted position.

17. A pulling-over and toe lasting machine having, in combination, means for pulling an upper over a last, automatic means for clamping the upper on a continuous line about the toe while it is held by the upper pulling means and for effecting relative movement of said clamping means and the last to wipe the upper heightwise of the toe, means for wiping the toe portion of the upper inwardly over the bottom of the last into lasted position while it is held by said clamping means, and means for fastening the upper in lasted position after the overwiping operation.

18. A pulling-over and toe lasting machine having, in combination, upper pulling means comprising a toe gripper and opposite side grippers, overlaying and fastening devices at the opposite sides of the forepart of the shoe, means for operating said overlaying and fastening devices to lay the upper inwardly and to fasten it at the sides of the forepart at the rear of the toe while the toe gripper continues to hold the upper, and automatic means for thereafter wiping the toe portion of the upper into lasted position and for driving a plurality of lasting tacks to hold it in lasted position.

19. A pulling-over and toe lasting machine having, in combination, upper pulling means comprising a toe gripper and opposite side grippers, overlaying and fastening devices at the opposite sides of the forepart of the shoe, means for operating said overlaying and fastening devices to lay the upper inwardly and to fasten it at the sides of the forepart at the rear of the toe while the toe gripper continues to hold the upper, toe wiping mechanism automatically operative thereafter to wipe the upper about the toe heightwise of the last and inwardly over the bottom of the last into lasted position, and means for driving a plurality of tacks about the toe to hold the upper in lasted position.

20. A pulling-over and toe lasting machine having, in combination, means for pulling an upper over a last, overlaying and fastening devices at the opposite sides of the forepart of the shoe, means for operating said overlaying and fastening devices to lay the upper inwardly and to fasten it at the sides of the forepart at the rear of the toe, and means for thereafter wiping the upper about the toe into lasted position and for driving a plurality of lasting tacks to hold it in lasted position.

21. A pulling-over and toe lasting machine having, in combination, means for pulling an upper over a last, overlaying and fastening devices at the opposite sides of the forepart of the shoe, means for operating said overlaying and fastening devices to lay the upper inwardly and to fasten it at the sides of the forepart at the rear of the toe and for then withdrawing said devices from the shoe, and toe lasting mechaism comprising wipers and tacking devices movable thereafter to wipe the upper into lasted position about the toe and to drive a plurality of lasting tacks to hold it in lasted position.

22. A pulling-over and toe lasting machine having, in combination, means for pulling an upper over a last, toe lasting mechanism comprising overwiping and tacking devices movable as a unit to wipe the upper about the toe into lasted position and to position the tacking devices relatively to the shoe, devices for overlaying and fastening the upper at the sides of the forepart at the rear of the toe, and means for operating the side overlaying and fastening devices and for withdrawing them from the shoe prior to the movement of said toe overwiping the tacking devices over the shoe.

23. A pulling-over and toe lasting machine having, in combination, means for pulling an upper over a last, wipers for wiping the upper about the toe into lasted position over the bottom of the last by bodily movement lengthwise of the shoe and swinging movements laterally of the shoe, means movable with said wipers toward the shoe to embrace and clamp the upper on a continuous line about the toe while the upper is held by the upper pulling means and before the wipers begin to wipe the upper inwardly over the bottom of the last, and means for fastening the upper in lasted position after the overwiping operation.

24. A pulling-over and toe lasting machine having, in combination, means for pulling an upper over a last, separate devices operately movable in time relation to each other and arranged respectively to wipe the upper heightwise of the toe while engaging it on a continuous line about the toe and to wipe it inwardly over the bottom of the last into lasted position, and means for fastening the upper about the toe in lasted position.

25. A pulling-over and toe lasting machine having, in combination, means for pulling an upper over a last, different sets of wiper plates curved to conform substantially to the contour of the toe and arranged respectively to wipe the upper heightwise of the toe and inwardly over the bottom of the last into lasted position, and automatic means for fastening the upper about the toe in lasted position after the overwiping operation.

26. In a machine of the class described, means for pulling an upper over a last comprising a gripper for gripping and pulling the upper at the toe end of the last, spring means for yieldably moving the toe gripper lengthwise of the last to pull the upper outwardly from the edge of the insole in the upper pulling operation, means for laying the upper inwardly over the bottom of the last after the upper pulling operation, and means for moving said toe gripper positively lengthwise of the last to make way for the overlaying means.

27. In a machine of the class described, means for pulling an upper over a last comprising a gripper for gripping and pulling the upper at the toe end of the last, means for laying the upper inwardly over the bottom of the last after the upper pulling operation, controlling means for moving the toe gripper lengthwise of the last to make way for said overlaying means comprising a member arranged to engage said gripper, spring means for holding the gripper against said member, and a cam on the gripper arranged to engage said member and movable with the gripper in the upper pulling operation into position to cause said spring means to impart to the gripper movement lengthwise of the last to pull the upper outwardly from the edge of the insole.

28. In a machine of the class described, means for pulling an upper over a last comprising a gripper for gripping and pulling the upper at the toe end of the last, wipers and tackers movable inwardly over the bottom of the last about the toe after the upper pulling operation, and positive means for imparting to said toe gripper movement of predetermined extent lengthwise of the last out of the path of movement of said wipers and tackers.

29. In a machine of the class described, the combination with shoe positioning means, of upwiping means and overwiping means mounted for movement together heightwise of the toe of the shoe to cause the upwiping means to wipe the upper about the toe to the edge of the insole and to position the overwiping means in the proper plane for the overwiping operation, and mechanism for operating said upwiping means and overwiping means in automatically determined time relation to each other to upwipe the upper and to wipe it inwardly over the insole.

30. In a machine of the class described, the combination with shoe positioning means, of toe lasting mechanism comprising separate sets of wiper plates for upwiping and for overwiping the upper respectively, said sets of wiper plates being mounted for movement as a unit heightwise of the toe of the shoe in the upwiping operation, and power-driven means for operating said toe lasting mechanism to upwipe the upper and thereafter to wipe it inwardly over the bottom of the last in time relation to the upwiping operation.

31. In a machine of the class described, the combination with shoe positioning means, of toe lasting mechanism comprising upwiping means and overwiping means movable as a unit lengthwise of the shoe to carry the upwiping means into operative engagement with the upper about the toe and movable also as a unit heightwise of the toe with said upwiping means in operative engagement with the upper, and power-driven means for operating said upwiping means and overwiping means in time relation to each other.

32. In a machine of the class described, the combination with shoe positioning means, of a wiper carrier having thereon wipers for wiping the upper about the toe inwardly over the bottom of the last and also means for wiping the upper heightwise of the toe, yieldable means for moving said wiper carrier lengthwise of the shoe to carry the upwiping means into operative engagement with the upper, and means for moving said wiper carrier heightwise of the toe to upwipe the upper.

33. In a machine of the class described, the combination with shoe positioning means, of toe lasting mechanism comprising a plurality of pairs of wiper plates mounted to swing about axes located substantially midway of the end of the toe of the shoe to close them about the toe, one pair of said wiper plates being constructed and arranged to upwipe the upper and another pair to wipe the upper inwardly over the bottom of the last, a strip of flexible material between the upwiping wiper plates and the shoe, means for effecting relative movement of th shoe and said toe lasting mechanism to upwipe the upper, and means for operating the overwiping wiper plates to wipe the upper inwardly over the bottom of the last.

34. In a machine of the class described, the combination with shoe positioning means, of toe lasting mechanism comprising a wiper carrier having thereon a plurality of separate sets of wiper plates constructed and arranged respectively to wipe the upper heightwise of the toe and inwardly over the bottom of the last, means for moving said wiper carrier heightwise of the toe to upwipe the upper, and automatic means for thereafter operating the overwiping wiper plates to wipe the upper inwardly over the bottom of the last.

35. In a machine of the class described, the combination with shoe positioning means, of toe lasting mechanism comprising a wiper carrier movable lengthwise of the shoe and having thereon wipers for wiping the upper heightwise of the toe and wipers for wiping the upper inwardly over the bottom of the last, mechanism automatically operative in time relation to the movement of the wiper carrier lengthwise of the shoe to close said first-named wipers about the toe, and automatic means for thereafter closing said last-named wipers to wipe the upper inwardly.

36. In a machine of the class described, the combination with shoe positioning means, of toe lasting mechanism comprising a wiper carrier movable lengthwise of the shoe and having thereon wipers for embracing the upper about the toe and for wiping it heightwise of the toe, mechanism on said wiper carrier for closing said wipers about the toe, a wiper holder mounted on said wiper carrier to move relatively to said carrier lengthwise of the shoe, wipers carried by said wiper holder for wiping the upper inwardly over the bottom of the last, and mechanism operative in response to such movement of the wiper holder to close the last-named wipers over the shoe during their advancing movement lengthwise of the shoe.

37. In a machine of the class described, the combination with shoe positioning means, of toe lasting mechanism comprising automatic means for wiping the upper about the toe heightwise of the last and inwardly over the insole and means for driving a plurality of lasting tacks about the end and along the sides of the toe to hold the upper in lasted position.

38. In a machine of the class described, the combination with shoe positioning means, of toe lasting mechanism comprising different devices automatically operative in time relation to one another respectively to wipe the upper heightwise of the toe, to wipe it inwardly over the insole, and to drive a plurality of lasting tacks to hold the upper in lasted position.

39. In a machine of the class described, the combination with shoe positioning means, of toe lasting mechanism comprising upwiping means and overwiping means movable as a unit heightwise of the toe to cause said upwiping means to upwipe the upper, said overwiping means being movable to wipe the upper inwardly over the bottom of the last, and tacking mechanism movable with said overwiping means into position for driving a plurality of lasting tacks to hold the upper in lasted position.

40. In a machine of the class described, the combination with shoe positioning means, of toe lasting mechanism comprising upwiping means, overwiping means and tacking mechanism all movable as a unit heightwise of the toe with the upwiping means in operative engagement with the upper, said overwiping means and tacking mechanism being movable together inwardly over the bottom of the last to wipe the upper into lasted position and to position the tacking mechanism for driving tacks to hold the upper.

41. In a machine of the class described, the combination with shoe positioning means, of toe lasting mechanism comprising upwiping means, overwiping means and tacking mechanism movable as a unit lengthwise of the shoe to carry the upwiping means into operative position, means for effecting relative movement of the last and said upwiping means to upwipe the upper, and means for moving said overwiping means and tacking mechanism inwardly over the bottom of the shoe to wipe the upper into lasted position and to position the tacking mechanism for driving tacks to hold the upper.

42. In a machine of the class described, the combination with shoe positioning means, of toe lasting mechanism comprising a wiper carrier having thereon upwiping means, overwiping means and tacking mechanism, power-driven means for moving said wiper carrier lengthwise of the shoe to carry the upwiping means into operative position and for thereafter effecting relative movement of the shoe and said wiper carrier to wipe the upper heightwise of the toe, and power-driven means for operating the overwiping means and the tacking mechanism to wipe the upper into lasted position and to drive a plurality of lasting tacks about the toe to hold it in lasted position.

43. In a machine of the class described, the combination with shoe positioning means, of toe lasting mechanism comprising a wiper carrier having thereon upwiping means, overwiping means and tacking mechanism, said wiper carrier being mounted for operative movement lengthwise of the shoe and heightwise of the shoe, and said overwiping means and tacking mechanism being movable relatively to the wiper carrier lengthwise and laterally of the shoe in the toe lasting operation.

44. In a machine of the class described, the combination with shoe positioning means, of toe lasting mechanism comprising wipers for wiping the upper about the toe into lasted position over the bottom of the last, tacking mechanism movable with said wipers into position to drive a plurality of tacks about the toe to hold the upper in lasted position, and means movable in automatically determined time relation to the operative movement of said wipers into position to embrace and clamp the upper about the toe.

45. In a machine of the class described, the combination with shoe positioning means, of toe lasting mechanism comprising wipers mounted for bodily movement toward the shoe and also for swinging movements laterally of the shoe for wiping the upper about the toe into lasted position over the bottom of the last, tacking mechanism movable with said wipers toward the shoe and laterally thereof into position to drive a plurality of tacks about the toe to hold the upper in lasted position, and means movable with said wipers toward the shoe to embrace and clamp the upper about the toe preparatory to the overwiping operation.

46. In a machine of the class described, the combination with shoe positioning means, of toe lasting mechanism comprising different sets of toe-embracing wiper plates constructed and arranged respectively to wipe the upper heightwise of the toe and inwardly over the bottom of the last, and tacking mechanism movable with the overwiping wiper plates into position for driving tacks to hold the upper.

47. In a machine of the class described, the combination with shoe positioning means, of toe lasting mechanism comprising different sets of toe-embracing wiper plates constructed and arranged respectively to wipe the upper heightwise of the toe and inwardly over the bottom of the last, and means mounted for movement in a predetermined path for fastening the upper about the toe in lasted position after the overwiping operation.

48. In a machine of the class described, the combination with shoe positioning means, of toe lasting mechanism comprising a wiper carrier having thereon wipers mounted for closing movement about the toe into position for wiping the upper heightwise of the toe, a slide on said wiper carrier movable lengthwise of the shoe relatively to said wipers and having thereon wipers mounted to close inwardly over the bottom of the last to wipe the upper into lasted position, and tacking devices carried by said slide and movable with said last-named wipers into position for driving tacks to hold the upper.

49. In a machine of the class described, the combination with shoe positioning means, of toe lasting mechanism comprising separate devices operatively movable in automatically determined time relation to each other to unwipe and to overwipe the upper, and means for fastening the upper about the toe in lasted position after the overwiping operation.

50. In a machine of the class described, the combination with shoe positioning means, of means for clamping the upper about an end of the last, end-embracing wipers for thereafter wiping the upper inwardly over the bottom of the last, tacking mechanism movable lengthwise and laterally of the shoe with said wipers in fixed relation to the wipers into position for driving upper fastening tacks, and means for engaging the upper clamping means to limit the inward movement of said wipers and tackers as determined by the position of said upper clamping means.

51. In a machine of the class described, the combination with shoe positioning means, of means for upwiping the upper about the toe of the last and for thereafter holding the upper clamped about the toe, toe-embracing wipers movable in automatically determined time relation to said upwiping means to wipe the upper inwardly over the bottom of the last, and tacking mechanism movable inwardly with said wipers into position for driving upper fastening tacks, said upwiping means being constructed to limit the inward movement of said wipers and tackers.

52. In a machine of the class described, the combination with shoe positioning means, of end-embracing wipers mounted to close inwardly about an end of the shoe to wipe the upper into lasted position, and a plurality of tackers movable as a unit with each of said wipers in fixed relation thereto into position for driving tacks at the end and along the sides of the toe to hold the upper, the tackers of each unit being relatively adjustable to determine the locations of the tacks.

53. In a machine of the class described, the combination with shoe positioning means, of end-embracing wipers mounted to close inwardly about an end of the shoe to wipe the upper into lasted position, and a gang of tackers for each of said wipers comprising a plurality of separate relatively adjustable tackers clamped together to determine the relative locations of the tacks, each gang of tackers being movable as a unit with its wiper into position for driving tacks after the overwiping operation.

54. In a machine of the class described, the combination with shoe positioning means, of end-embracing wipers mounted to close inwardly about an end of the shoe to wipe the upper into lasted position, and a plurality of tackers movable as a unit with each of said wipers in fixed relation thereto into position for driving tacks at the end and along the sides of the toe to hold the upper, the tackers of each unit being relatively adjustable to vary the tacking locations, and each wiper having means thereon for determining the adjusted relation of the tackers associated therewith.

55. In a machine of the class described, the combination with shoe positioning means, of end-embracing wipers mounted to close inwardly about an end of the shoe to wipe the upper into lasted position, and a gang of tackers movable as a unit with each of said wipers into position for driving upper fastening tacks, the tackers associated with each of the wipers being adjustably mounted for relative sliding movements in fixed paths along the plane of the wipers in directions transverse to the edge of the shoe bottom, and each wiper having thereon shoulders which the respective tackers are arranged to engage to determine their adjusted relation.

56. In a machine of the class described, the combination with shoe positioning means, of end-embracing wipers mounted to close inwardly about an end of the shoe to wipe the upper into lasted position, a gang of tackers movable as a unit with each of said wipers into position for driving upper fastening tacks, the tackers associated with each of the wipers being adjustable relatively to one another to vary the tacking locations, means on each wiper for determining the adjusted relation of the tackers associated therewith, and means for securing said tackers in adjusted relation.

57. In a machine of the class described, the combination with shoe positioning means, of end-embracing wipers mounted to close inwardly about an end of the shoe to wipe the upper into lasted position, and a gang of tackers movable as a unit with each of said wipers in fixed relation thereto into position for driving upper fastening tacks, each gang of tackers being detachable as a unit independently of the wipers.

58. In a machine of the class described, the combination with shoe positioning means, of end-embracing wipers mounted to close inwardly about an end of the shoe to wipe the upper into lasted position, and a gang of tackers movable as a unit with each of said wipers into position for driving upper fastening tacks, each gang of tackers comprising a plurality of relatively adjustable plates arranged side by side and each provided with tack holding and tack driving means, and means for holding said plates in adjusted relation.

59. In a machine of the class described, the combination with shoe positioning means, of end-embracing wipers mounted to close inwardly about an end of the shoe to wipe the upper into lasted position, a plurality of tackers movable as a unit with each of said wipers into position for driving upper fastening tacks, the tackers associated with each of the wipers being adjustable relatively to one another along the plane of the wipers transversely of the edge of the shoe bottom, shoulders on each wiper for determining the adjusted relation of the tackers associated therewith, and springs for moving the different respective tackers into engagement with said shoulders in the assembling of the tackers with the wipers.

60. In a machine of the class described, the combination with shoe positioning means, of end-embracing wipers mounted to close inwardly about an end of the shoe to wipe the upper into lasted position, and a plurality of tackers movable as a unit with each of said wipers into position for driving upper fastening tacks, the tackers associated with each of the wipers being relatively adjustable to determine the locations of the tacks and having members movably mounted thereon in contiguous relation to one another, and means for clamping said members together to hold the tackers in adjusted relation without cramping said tackers.

61. In a machine of the class described, the combination with shoe positioning means, of end-embracing wipers mounted to close inwardly about an end of the shoe to wipe the upper into lasted position, and a gang of tackers movable as a unit with each of said wipers into position for driving upper fastening tacks, each gang of tackers comprising a plurality of relatively adjustable plates arranged side by side and having tack holding and driving means thereon, said plates having fingers pivoted thereon and arranged in contiguous relation to one another, and means for clamping said fingers together to hold the tackers in adjusted relation without cramping said plates.

62. In a machine of the class described, the combination with shoe positioning means, of end-embracing wipers mounted to close inwardly about an end of the shoe to wipe the upper into lasted position, and a gang of tackers movable with each of said wipers into position for driving upper fastening tacks and comprising a plurality of tack holders and drivers, each gang of tackers including a member common to the several drivers for operating said drivers.

63. In a machine of the class described, the combination with shoe positioning means, of end-embracing wipers mounted to close inwardly about an end of the shoe to wipe the upper into lasted position, and a gang of tackers movable as a unit with each of said wipers into position for driving upper fastening tacks, each gang of tackers comprising a holder and a plurality of relatively adjustable plates thereon provided with tack holders and drivers and secured in adjusted relation, and an operating member slidably mounted on said holder for operating the several tack drivers in different adjusted relation of said plates.

64. In a machine of the class described, the combination with shoe positioning means, of end-embracing wipers mounted to close inwardly about an end of the shoe to wipe the upper into lasted position, said wipers being detachable to permit different sets of wipers to be substituted for different shapes of shoes, and a gang of tackers movable with each of said wipers in fixed relation thereto into position for driving upper fastening tacks, each gang of tackers being displaceable as a unit to permit detachment of the wipers.

65. In a machine of the class described, the combination with shoe positioning means, of end-embracing wipers mounted to close inwardly about an end of the shoe to wipe the upper into lasted position, said wipers being detachable to permit different sets of wipers to be substituted for different shapes of shoes, and a group of tackers movable as a unit with each of the wipers in fixed relation thereto into position for driving upper fastening tacks, the tackers of each group being relatively adjustable to vary the tacking locations for different sets of wipers.

66. In a machine of the class described, the combination with shoe positioning means, of end-embracing wipers relatively movable in curved paths each about an axis located substantially at an end of the shoe to wipe the upper inwardly over the bottom of the last about the end of the shoe, supporting members connected to said wipers to move with then in correspondingly curved paths, and a gang of relatively adjustable tackers carried by each of said supporting members to move with the wipers into position for driving upper fastening tacks.

67. In a machine of the class described, the combination with shoe positioning means, of end-embracing wipers relatively movable in curved paths each about an axis located substantially at an end of the shoe to wipe the upper inwardly over the bottom of the last about the end of the shoe, supporting members connected to said wipers to move with them in correspondingly curved paths, and a gang of tackers carried by each of said supporting members and detachable as a unit therefrom.

In testimony whereof I have signed my name to this specification.

CHARLES F. PYM.